US012695581B2

(12) United States Patent
Shimezawa

(10) Patent No.: US 12,695,581 B2
(45) Date of Patent: Jul. 28, 2026

(54) COMMUNICATION APPARATUS, COMMUNICATION METHOD, AND RECORDING MEDIUM

(71) Applicant: Sony Group Corporation, Tokyo (JP)

(72) Inventor: Kazuyuki Shimezawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 1023 days.

(21) Appl. No.: 17/884,601

(22) Filed: Aug. 10, 2022

(65) Prior Publication Data

US 2022/0385440 A1 Dec. 1, 2022

Related U.S. Application Data

(63) Continuation of application No. 16/323,322, filed as application No. PCT/JP2017/025031 on Jul. 7, 2017, now abandoned.

(30) Foreign Application Priority Data

Aug. 10, 2016 (JP) ................................ 2016-157398

(51) Int. Cl.
*H04L 5/00* (2006.01)
*H04L 5/14* (2006.01)
(Continued)

(52) U.S. Cl.
CPC .............. *H04L 5/0094* (2013.01); *H04L 5/00* (2013.01); *H04L 5/0092* (2013.01);
(Continued)

(58) Field of Classification Search
CPC ....... H04L 5/0094; H04L 5/00; H04L 5/0092; H04L 5/0098; H04L 5/14; H04W 28/06;
(Continued)

(56) References Cited

U.S. PATENT DOCUMENTS

| 2014/0016541 | A1 | 1/2014 | Kim et al. |
| 2016/0219547 | A1* | 7/2016 | Seo ........................ H04W 72/21 |
| 2017/0245259 | A1 | 8/2017 | Islam et al. |

FOREIGN PATENT DOCUMENTS

| CN | 103782532 | A | 5/2014 |
| CN | 104067549 | A | 9/2014 |
| CN | 104969500 | A | 10/2015 |

OTHER PUBLICATIONS

3GPP, "Technical Specification Group Radio Access Network; Study on Scenarios and Requirements for Next Generation Access Technologies", 3rd Generation Partnership Project; 3GPP TR 38.913 V 0.3.0, Release 14, Mar. 2016, pp. 1-30.
(Continued)

*Primary Examiner* — Mandish K Randhawa
(74) *Attorney, Agent, or Firm* — XSENSUS, LLP

(57) ABSTRACT

[Object] To provide a mechanism that enables flexible design in relation to communication timing.
[Solution] A communication apparatus including: a communication control unit that controls communication with another communication apparatus, which is a communication counterpart, through frequency division duplexing (FDD). The communication control unit transmits a second sub frame that is transmitted from the communication apparatus to the other communication apparatus and corresponds to a first sub frame after the first sub frame that is transmitted from the other communication apparatus to the communication apparatus.

20 Claims, 28 Drawing Sheets

(51) Int. Cl.

| | |
|---|---|
| *H04W 28/06* | (2009.01) |
| *H04W 56/00* | (2009.01) |
| *H04W 72/04* | (2023.01) |
| *H04W 72/0446* | (2023.01) |

(52) U.S. Cl.

CPC .............. *H04L 5/0098* (2013.01); *H04L 5/14* (2013.01); *H04W 28/06* (2013.01); *H04W 56/00* (2013.01); *H04W 72/04* (2013.01); *H04W 72/0446* (2013.01)

(58) Field of Classification Search

CPC .. H04W 56/00; H04W 72/04; H04W 72/0446

See application file for complete search history.

(56) References Cited

OTHER PUBLICATIONS

3GPP, "Technical Specification Group Radio Access Network; Evolved Universal Terrestrial Radio Access (E-UTRA); Physical layer procedures", 3rd Generation Partnership Project; 3GPP TS 36.213 V13.2.0, Release 13, Jun. 2016, pp. 1-381.

Qualcomm Incorporated, "Frame structure requirements", 3GPP TSG RAN WG1 Meeting# 85 R1-164694, Nanjing China, May 23-27, 2016, pp. 1-5.

Alcatel-Lucent, "WF on Physical Channel Timing Relationships", 3GPP TSG-RAN WG1 Meeting# 82 R1-154819, Beijing China, Aug. 24-28, 2015, 4 Pages.

Ericsson, "On UL Subframe Structure for Enhanced LAA", 3GPP TSG-RAN WG1 Meeting# 84bis R1-163141, Busan Korea, Apr. 11-15, 2016, 6 pages.

Samsung, "Discussion on TTI, subframe and signalling timing for NR", 3GPP TSG-RAN WG1 Meeting# 85 R1-164004, Nanjing China, May 23-27, 2016, 6 pages.

Nokia, "Basic frame structure principles for 5G", 3GPP TSG-RAN WG1 Meeting# 85 R1-165027, Nanjing P.R. China, May 23-27, 2016, 7 pages.

Mediatek Inc., "Flexible Frame Structure for New Radio Access Technology", 3GPP TSG-RAN WG1 Meeting# 85, R1-165163, Nanjing China, May 23-27, 2016, 6 pages.

International Search Report mailed on Aug. 22, 2017 for PCT/JP2017/025031 filed on Jul. 7, 2017, 8 pages.

Extended European Search Report issued Jul. 1, 2019 in European Application No. 17893123.1-1219.

Ericsson, "Physical Channel Timing Relationships for MTC", 3GPP Draft; R1-144558 Physical Channel Timing Relationships for MTC, 3rd Generation Partnership Project (3GPP), vol. RAN WG1, Nov. 17, 2014.

\* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

TIME

Rx TIMING OF SIGNAL FROM FAR UE

Tx TIMING     Rx TIMING OF SIGNAL FROM NEAR UE

COMMUNICATION APPARATUS, COMMUNICATION METHOD, AND RECORDING MEDIUM

CROSS-REFERENCE TO RELATED APPLICATIONS

The present application is a continuation of U.S. application Ser. No. 16/323,322, filed Feb. 5, 2019, which is based on PCT filing PCT/JP2017/025031, filed Jul. 7, 2017, and claims priority to 2016-157398, filed in the Japanese Patent Office on Aug. 10, 2016, the entire contents of each of which being incorporated herein by reference.

TECHNICAL FIELD

The present disclosure relates to a communication apparatus, a communication method, and a recording medium.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

Next, influences of propagation delay will be described. For example, propagation delay occurs in transmission signals from terminal devices in accordance with distances to a base station in uplink transmission. Also, since the respective transmission signals interfere with one another in a case in which differences in reception times of the respective transmission signals transmitted from a plurality of terminal devices located at different distances to the base station exceed a cyclic prefix (CP), the interference affects transmission properties. As one of methods for solving such a problem, the base station can match reception timings at the base station by individually controlling transmission timings for the respective terminal devices. Such control is also called timing advance (TA). According to timing advance in LTE, for example, the base station specifies deviation of reception timings at the base station on the basis of uplink transmission of PRACH, SRS, or the like transmitted from the terminal devices and notifies the terminal devices of control information for controlling transmission timings for the terminal devices. The terminal devices adjust transmission timings on the basis of the control information provided as the notifications from the base station and perform uplink transmission. Details of the timing advance in LTE are disclosed in Non-Patent Literature 2.

Also, a self-contained (self-completing type) sub frame has been considered as a frame configuration suitable for low latency communication, in particular, for NR. In the self-contained sub frame, for example, one sub frame includes downlink data and uplink HARQ-ACK corresponding to the downlink data. In the self-contained sub frame, one sub frame includes downlink control information and uplink data scheduled for the downlink control information. For example, details of the self-contained sub frame are disclosed in Non-Patent Literature 4.

CITATION LIST

Patent Literature

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 VO. 3.0 (2016-03). <http: //www.3gpp.org/ftp/Specs/archive/38 series/38.913/38913-030.zip>

Non-Patent Literature 2: 3rd Generation Partnership Project; Technical Specification Group Radio Access Network; Evolved Universal Terrestrial Radio Access (E-UTRA); Physical layer procedures (Release 13), 3GPP TS 36.213 V13.2.0 (2016-06).

Non-Patent Literature 3: R1-164694, Frame structure requirements, Qualcomm Incorporated, 3GPP TSG RAN WG1 Meeting #85, Nanjing, China, 23-27th May 2016.

SUMMARY OF INVENTION

Technical Problem

Since various use cases are flexibly supported in NR, there is a higher probability that transmission signals, frame configurations, channel configurations, and the like are extended than LTE. However, NR is still being studied, and it is difficult to state that technologies for supporting various assumed use cases have sufficiently been proposed. For example, a technology for supporting various use cases in relation to timings of communication performed between communication apparatuses is also one of the technologies that have not sufficiently been proposed.

Thus, the present disclosure provides a mechanism that enables flexible design in relation to communication timing.

Solution to Problem

According to the present disclosure, there is provided a communication apparatus including: a communication control unit that controls communication with another communication apparatus, which is a communication counterpart, through frequency division duplexing (FDD). The communication control unit transmits a second sub frame that is transmitted from the communication apparatus to the other communication apparatus and corresponds to a first sub frame after the first sub frame that is transmitted from the other communication apparatus to the communication apparatus.

In addition, according to the present disclosure, there is provided a communication apparatus including: a communication control unit that controls communication with another communication apparatus, which is a communication counterpart, through FDD. The communication control unit processes, in an associated manner, a first sub frame that is transmitted from the communication apparatus to the other communication apparatus and a second sub frame that is transmitted from the other communication apparatus to the communication apparatus after the first sub frame and corresponds to the first sub frame.

In addition, according to the present disclosure, there is provided a communication method that is executed by a processor of a communication apparatus, the communication method including: controlling communication with another communication apparatus, which is a communication counterpart, through FDD. The controlling the communication includes transmitting a second sub frame that is transmitted from the communication apparatus to the other communication apparatus and corresponds to a first sub frame after the first sub frame that is transmitted from the other communication apparatus to the communication apparatus.

In addition, according to the present disclosure, there is provided a communication method that is executed by a processor of a communication apparatus, the communication method including: controlling communication with another communication apparatus, which is a communication counterpart, through FDD. The controlling the communication includes processing, in an associated manner, a first sub frame that is transmitted from the communication apparatus to the other communication apparatus and a second sub frame that is transmitted from the other communication apparatus to the communication apparatus after the first sub frame and corresponds to the first sub frame.

In addition, according to the present disclosure, there is provided a recording medium having a program recorded thereon, the program causing a computer to function as a communication apparatus including a communication control unit that controls communication with another communication apparatus, which is a communication counterpart, through FDD. The communication control unit transmits a second sub frame that is transmitted from the communication apparatus to the other communication apparatus and corresponds to a first sub frame after the first sub frame that is transmitted from the other communication apparatus to the communication apparatus.

In addition, according to the present disclosure, there is provided a recording medium having a program recorded thereon, the program causing a computer to function as a communication apparatus including a communication control unit that controls communication with another communication apparatus, which is a communication counterpart, through FDD. The communication control unit processes, in an associated manner, a first sub frame that is transmitted from the communication apparatus to the other communication apparatus and a second sub frame that is transmitted from the other communication apparatus to the communication apparatus after the first sub frame and corresponds to the first sub frame.

Advantageous Effects of Invention

According to the present disclosure, a mechanism that enables flexible design in relation to communication timing is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

FIG. 10 is a diagram illustrating an example of downlink resource element mapping of NR according to the present embodiment.

FIG. 11 is a diagram illustrating an example of downlink resource element mapping of NR according to the present embodiment.

FIG. 14 is a diagram illustrating an example of non-orthogonally multiplexed transmission signal processing according to the present embodiment.

FIG. 15 is a diagram illustrating an example of non-orthogonally multiplexed reception signal processing according to the present embodiment.

DESCRIPTION OF EMBODIMENTS

Figure 1:
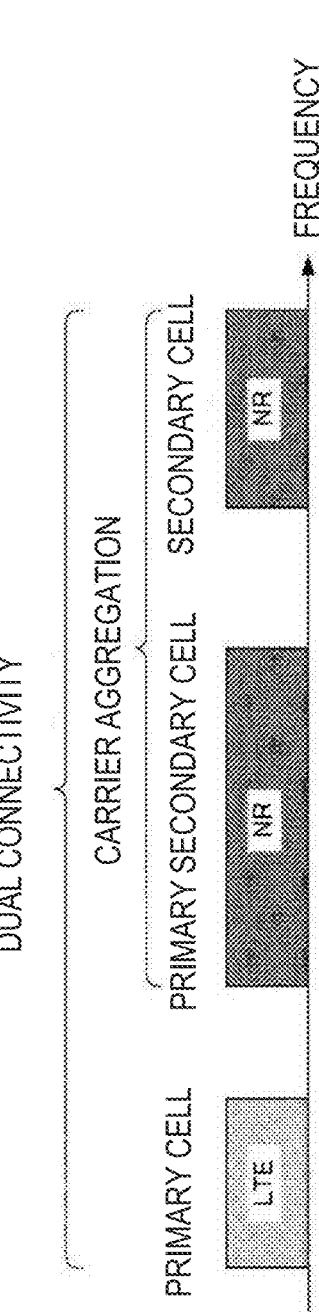
FIG. 1 is a diagram illustrating an example of setting of a component carrier according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.

Note that description will be performed in the following order.

1. Introduction
2. Technical problems
3. Technical features
3.1. Configuration example of higher layer processing unit
3.2. Frame configuration of NR
3.3. Transmission timing control
3.4. Supplementary note
4. Application examples
5. Conclusion

1. INTRODUCTION

First, background technologies of an embodiment of the present disclosure will be described.

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
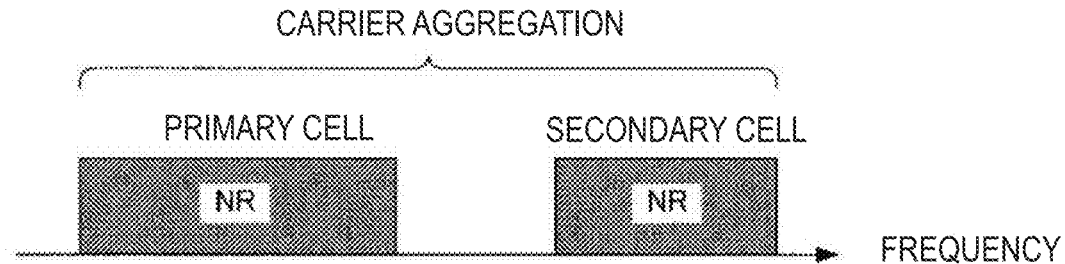
FIG. 2 is a diagram illustrating an example of setting of a component carrier according to the present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in time division duplex (TDD) and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to frequency division duplex (FDD). The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
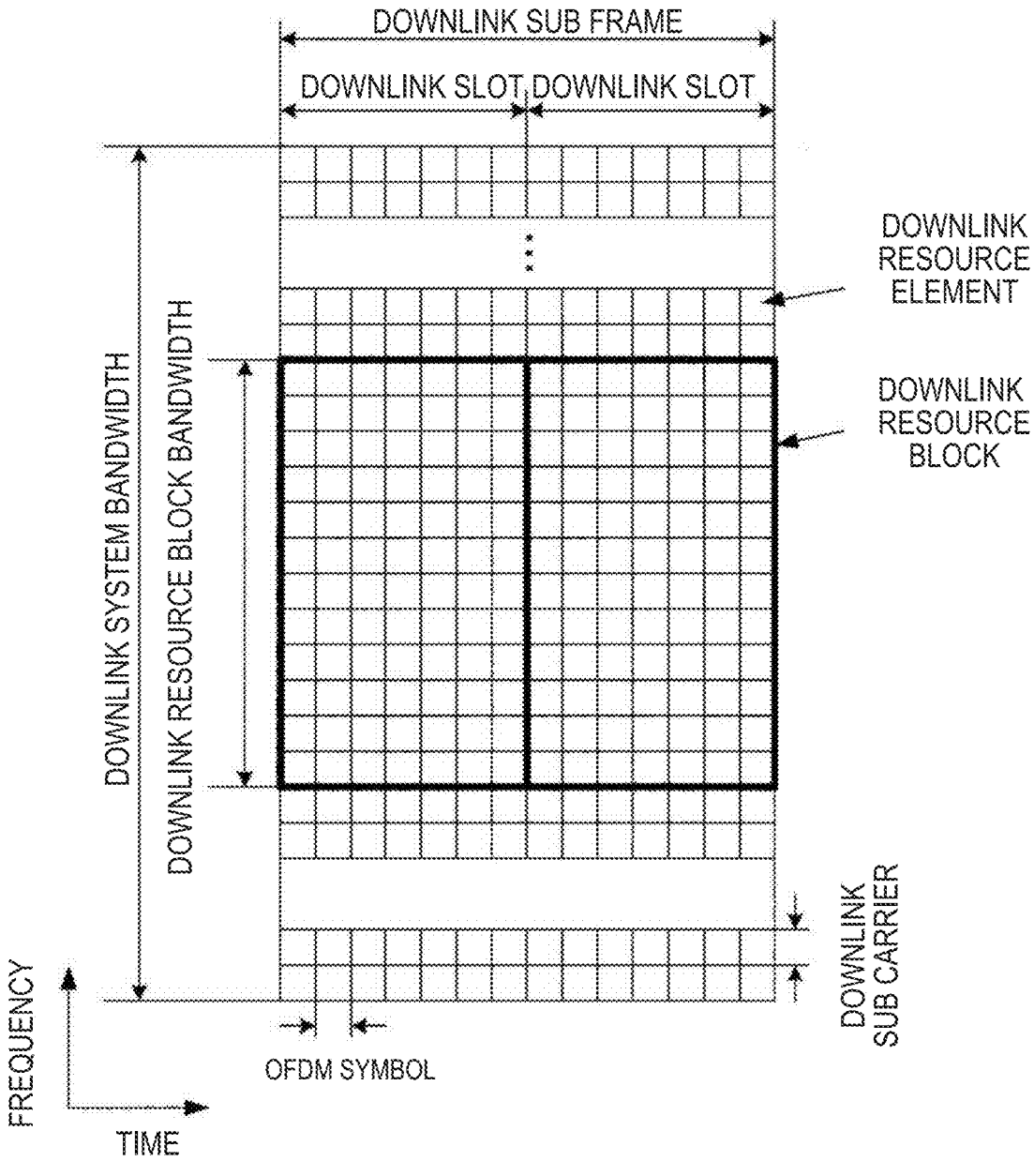
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
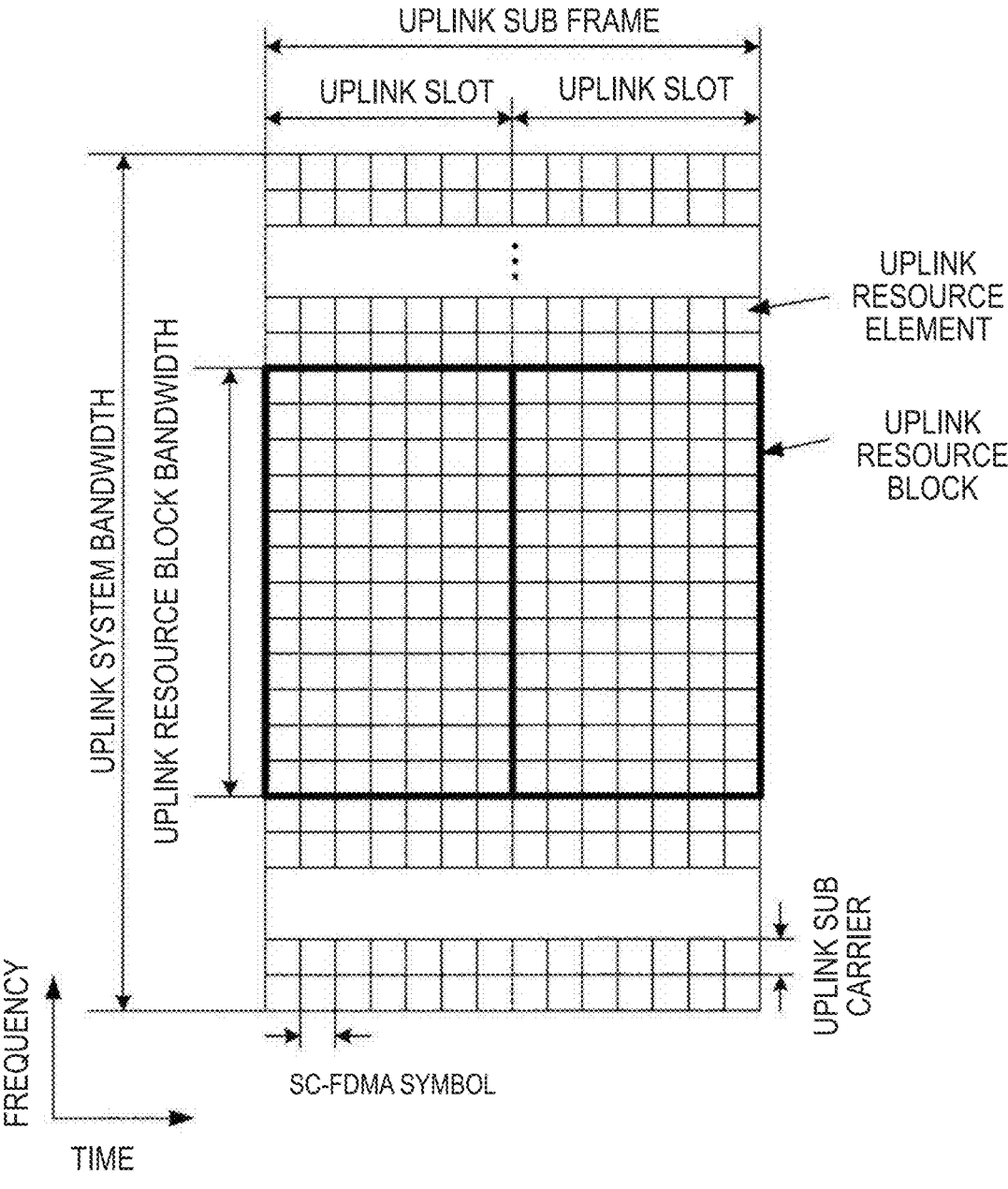
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
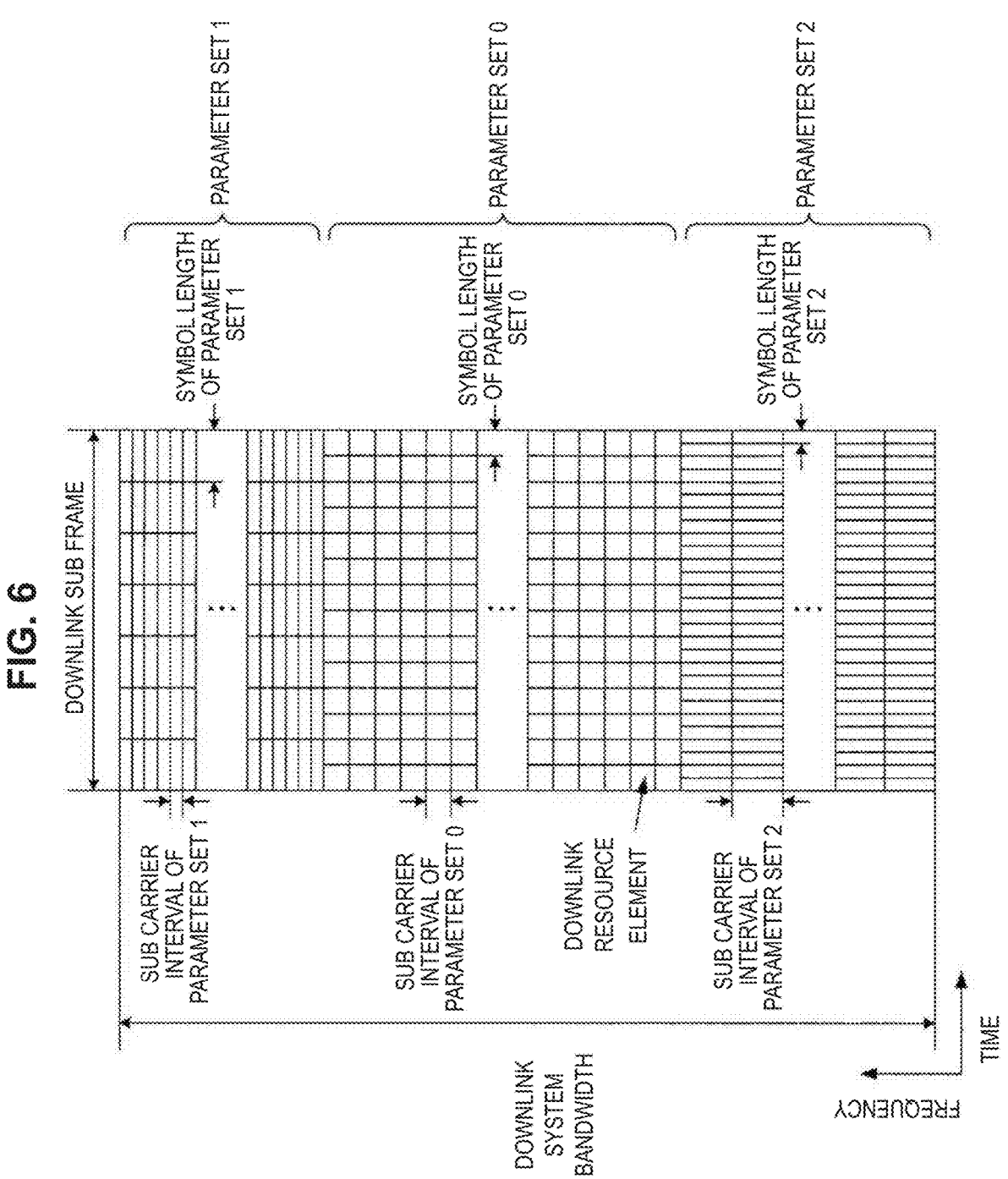
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
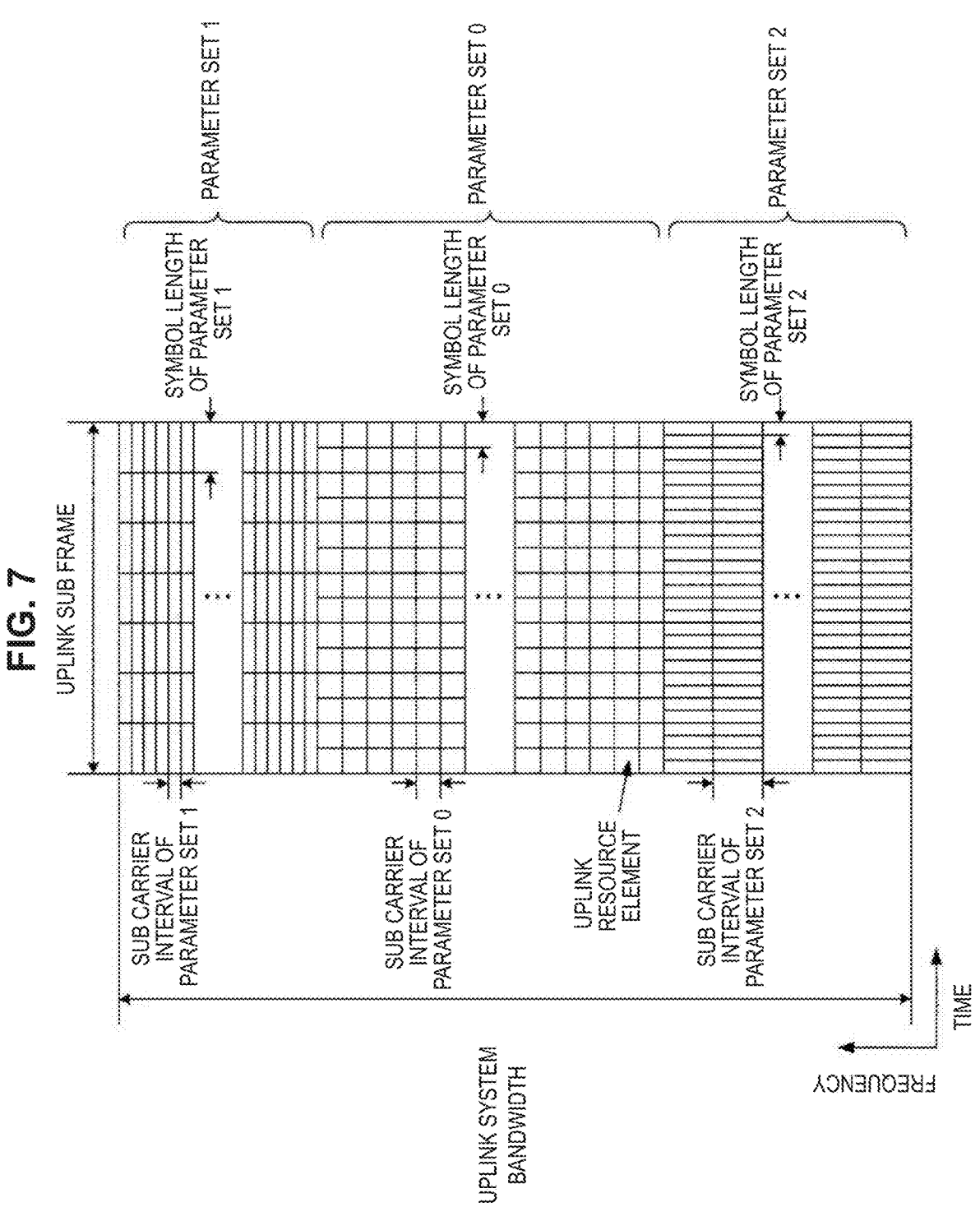
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<NR Physical Channel and NR Physical Signal in Present Embodiment>

In LTE, the description of the physical channel and the physical signal can also be applied to the NR physical channel and the NR physical signal, respectively. The NR physical channel and the NR physical signal are referred to as the following.

The NR downlink physical channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR downlink physical signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR uplink physical channel includes an NR-PUSCH, an NR-PUCCH, an NR-PRACH, and the like.

The NR uplink physical signal includes an NR-UL-RS. The NR-UL-RS includes an NR-UL-DMRS, an NR-SRS, and the like.

The NR sidelink physical channel includes an NR-PSBCH, an NR-PSCCH, an NR-PSDCH, an NR-PSSCH, and the like.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received by the terminal device 2, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Configuration Example of Base Station Device 1 in Present Embodiment>

Figure 8:
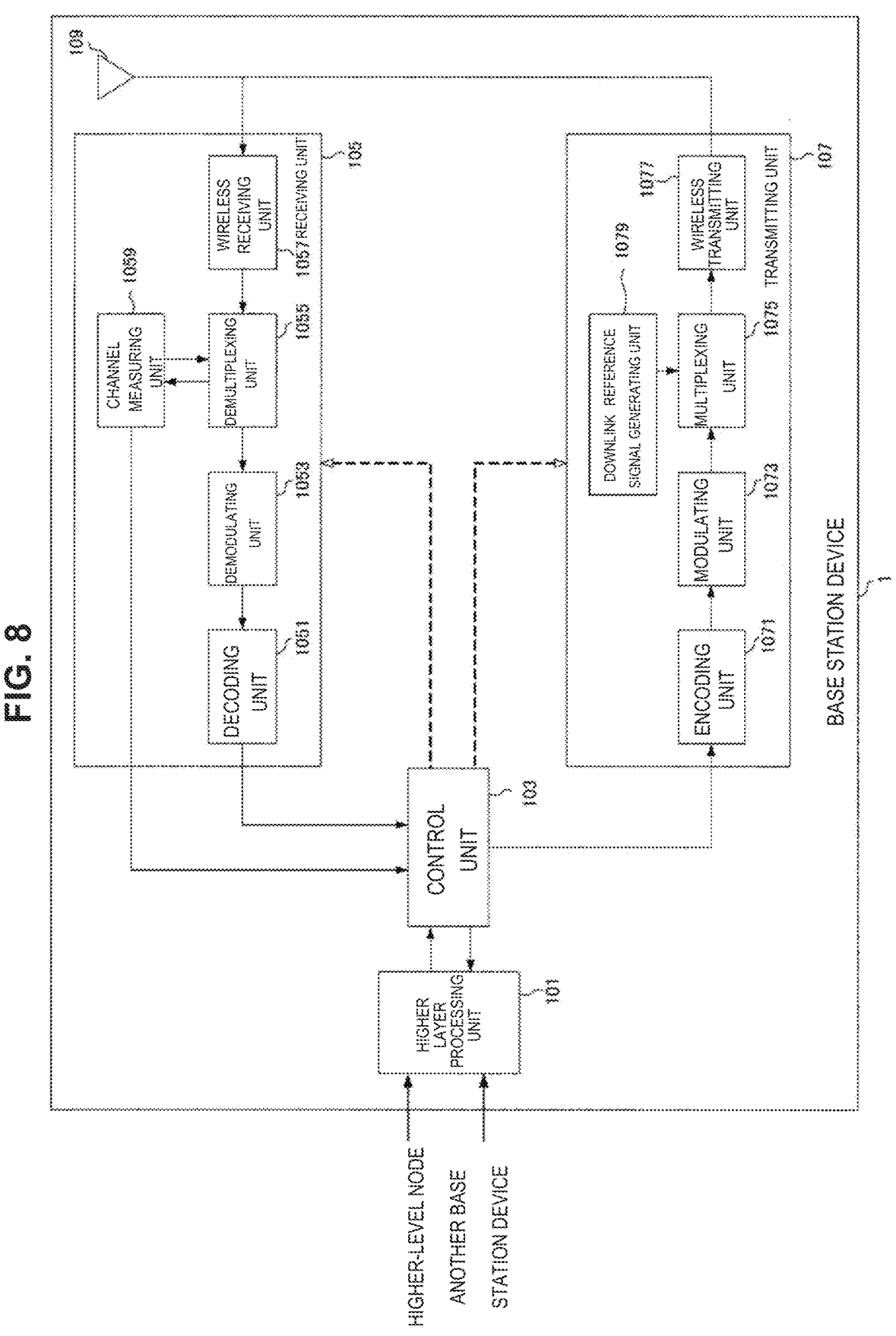
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 3, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a settings related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Terminal Device 2 in Present Embodiment>

Figure 9:
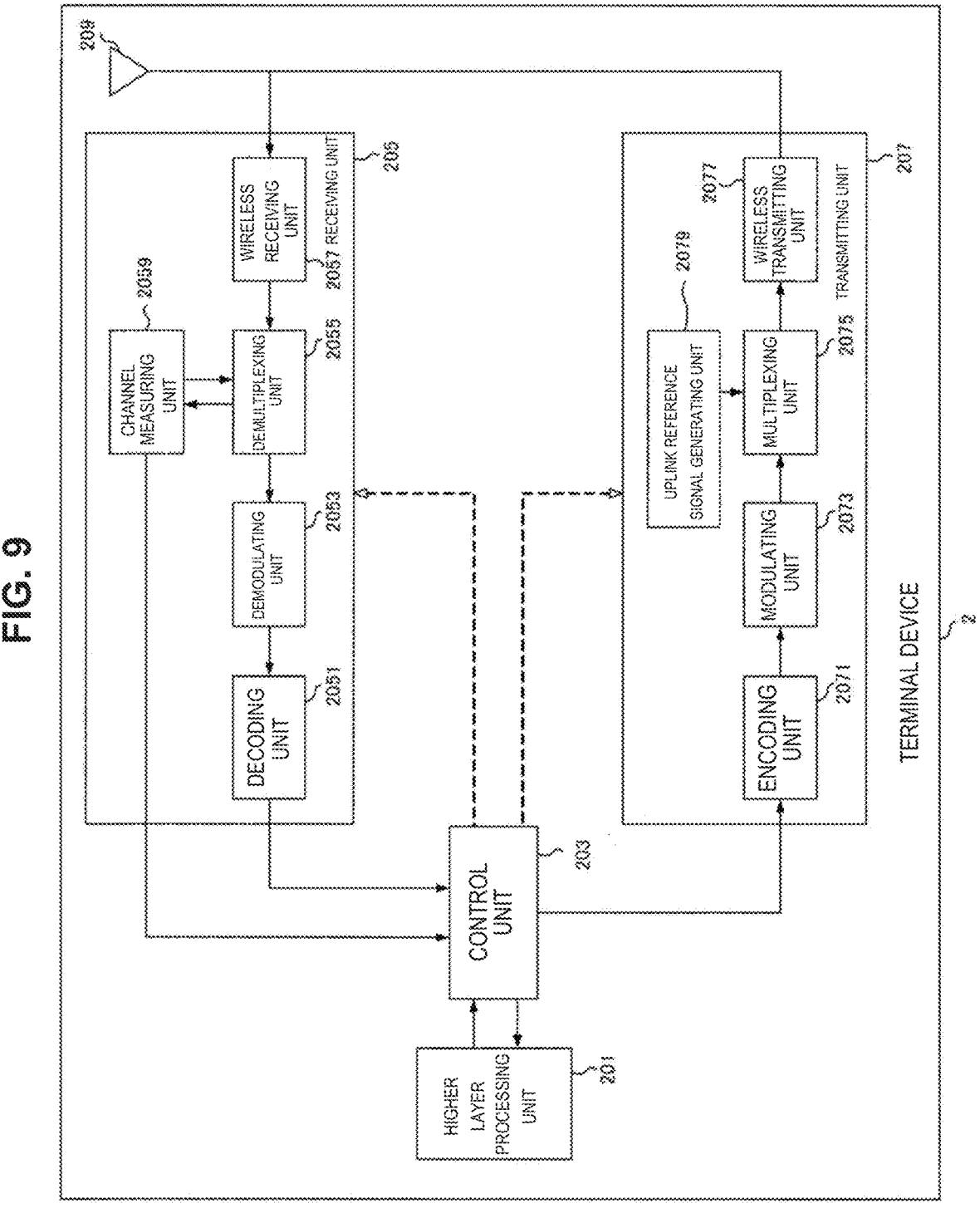
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 4, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH.

The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs is not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of Downlink Resource Elements Mapping of NR in Present Embodiment>

Figure 10:
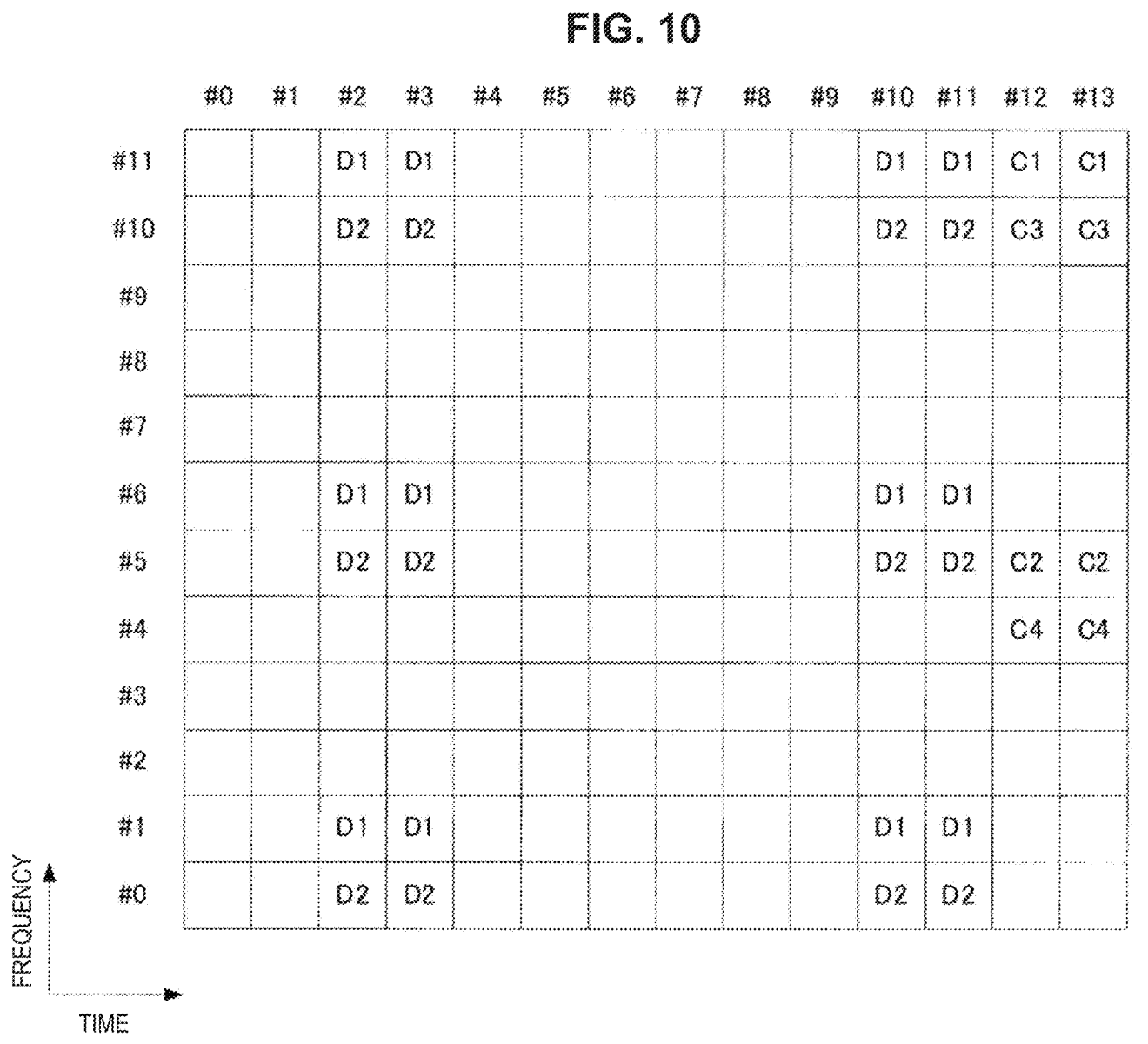

FIG. 10 is a diagram illustrating an example of the downlink resource element mapping of NR according to the present embodiment. FIG. 10 illustrates a set of resource elements in the predetermined resources in a case in which parameter set 0 is used. The predetermined resources illustrated in FIG. 10 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 10, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 11:
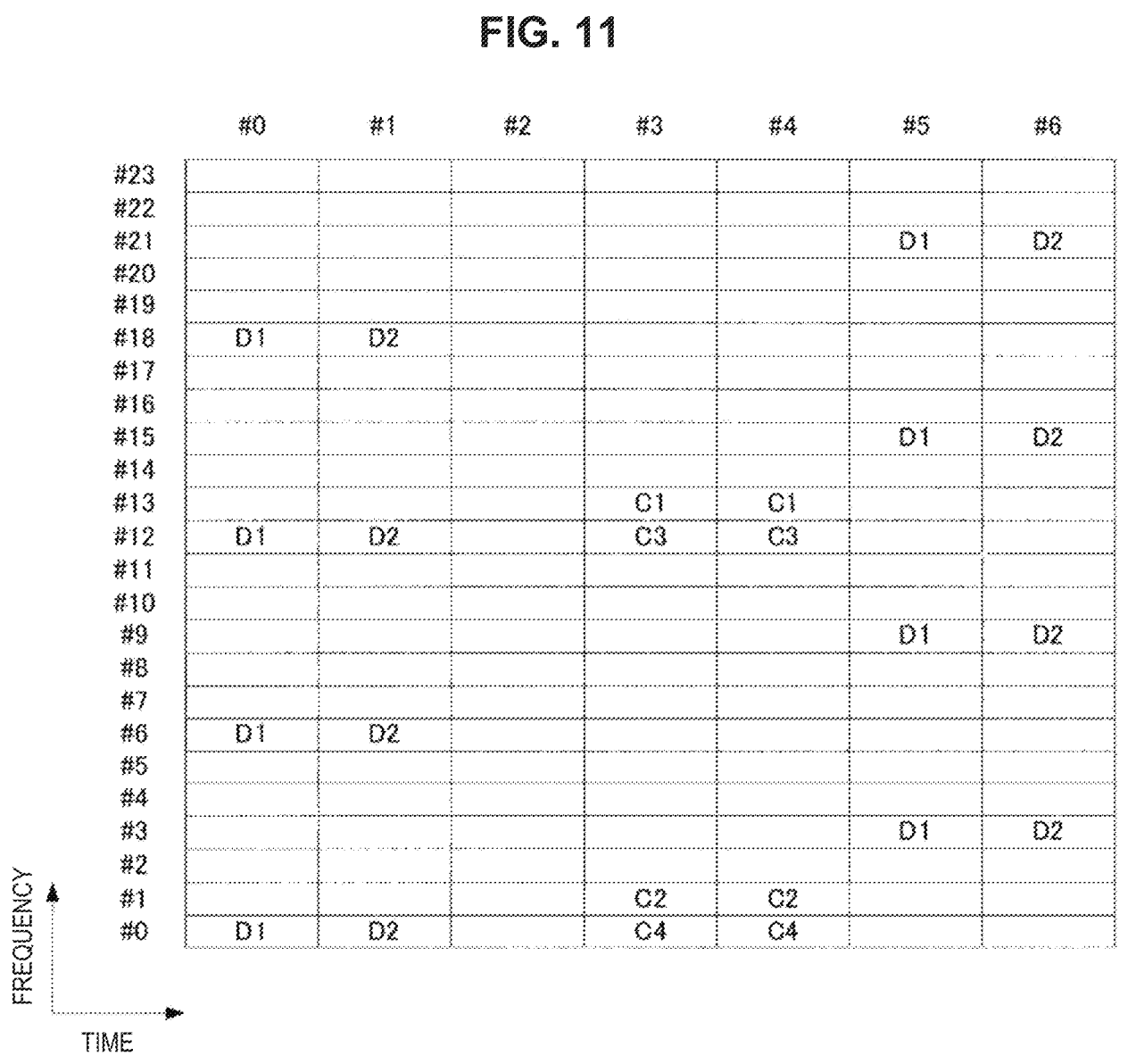

FIG. 11 is a diagram illustrating an example of the downlink resource element mapping of NR according to the present embodiment. FIG. 11 illustrates a set of resource elements in the predetermined resources in a case in which parameter set 1 is used. The predetermined resources illustrated in FIG. 11 are resources formed by the same time length and frequency bandwidth as one resource block pair in LTE.

In the example of FIG. 11, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
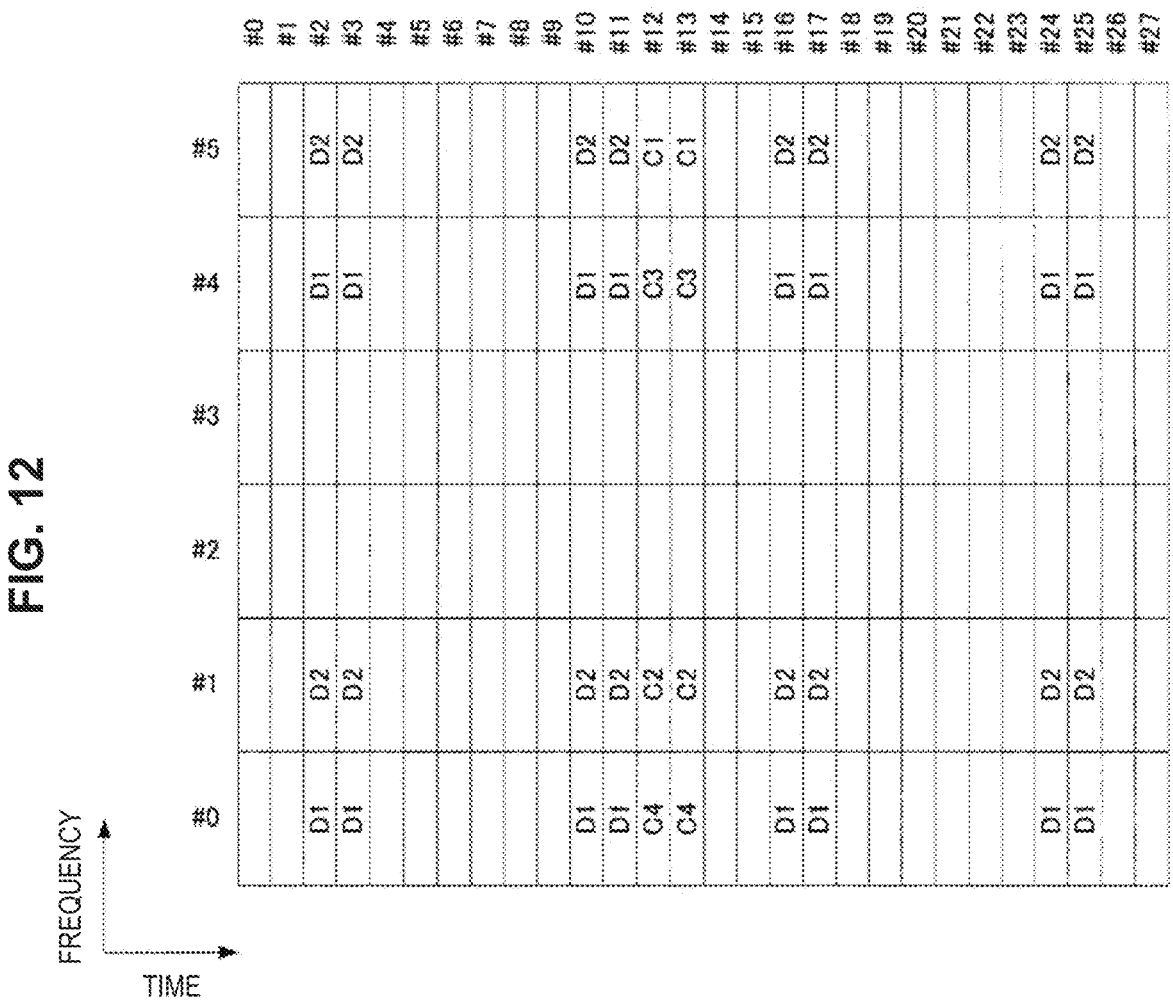
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Frame Configuration of NR in Present Embodiment>

Figure 13:
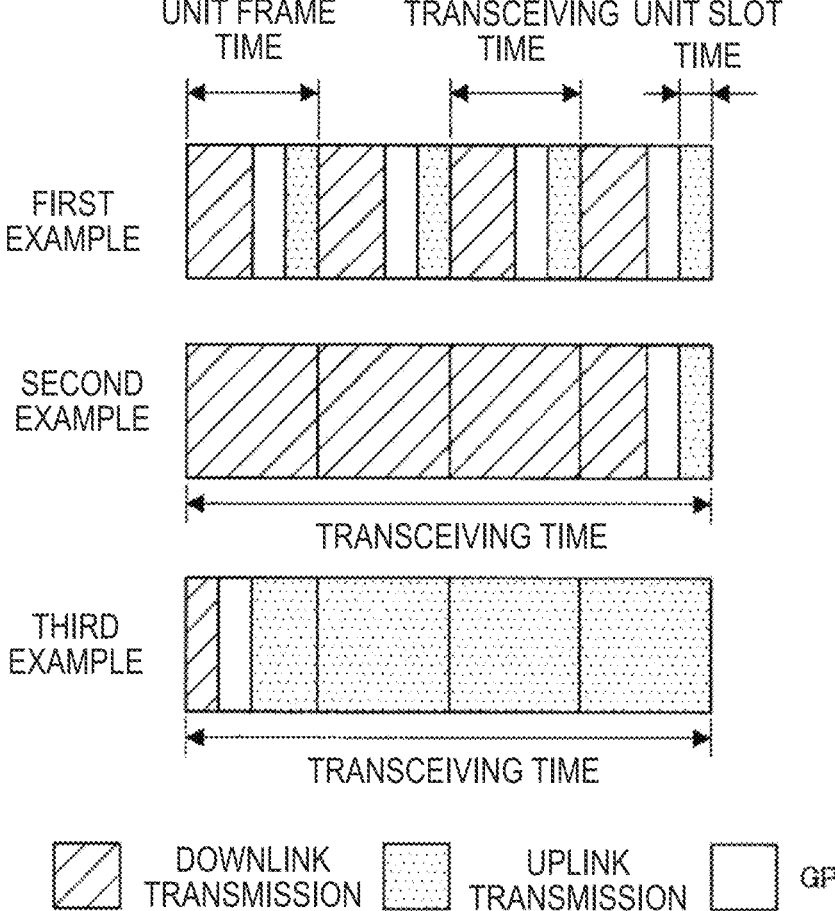
FIG. 13 is a diagram illustrating an example of a frame configuration of a self-contained transmission according to the present embodiment.

In NR, a physical channel and/or a physical signal can be transmitted by self-contained transmission. FIG. 13 illustrates an example of a frame configuration of the self-contained transmission in the present embodiment. In the self-contained transmission, single transceiving includes successive downlink transmission, a GP, and successive downlink transmission from the head in this order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, it is possible to realize low-delay communication of the downlink.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling.

The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval (TO, the symbol length, or the unit slot time of NR.

A transceiving time is one transceiving time. An interval between one transceiving and another transceiving is occupied by a time (gap) in which neither a physical channel nor a physical signal is transmitted. It is not preferable for the terminal device 2 to average CSI measurements between different transceivings. The transceiving time is also referred to as a TTI. One transceiving time is defined as, for example, an integer multiple of a sampling interval (Ts), a symbol length, a unit slot time, or a unit frame time of NR.

<Non-Orthogonal Multiple Access (NOMA)>

Figure 14:
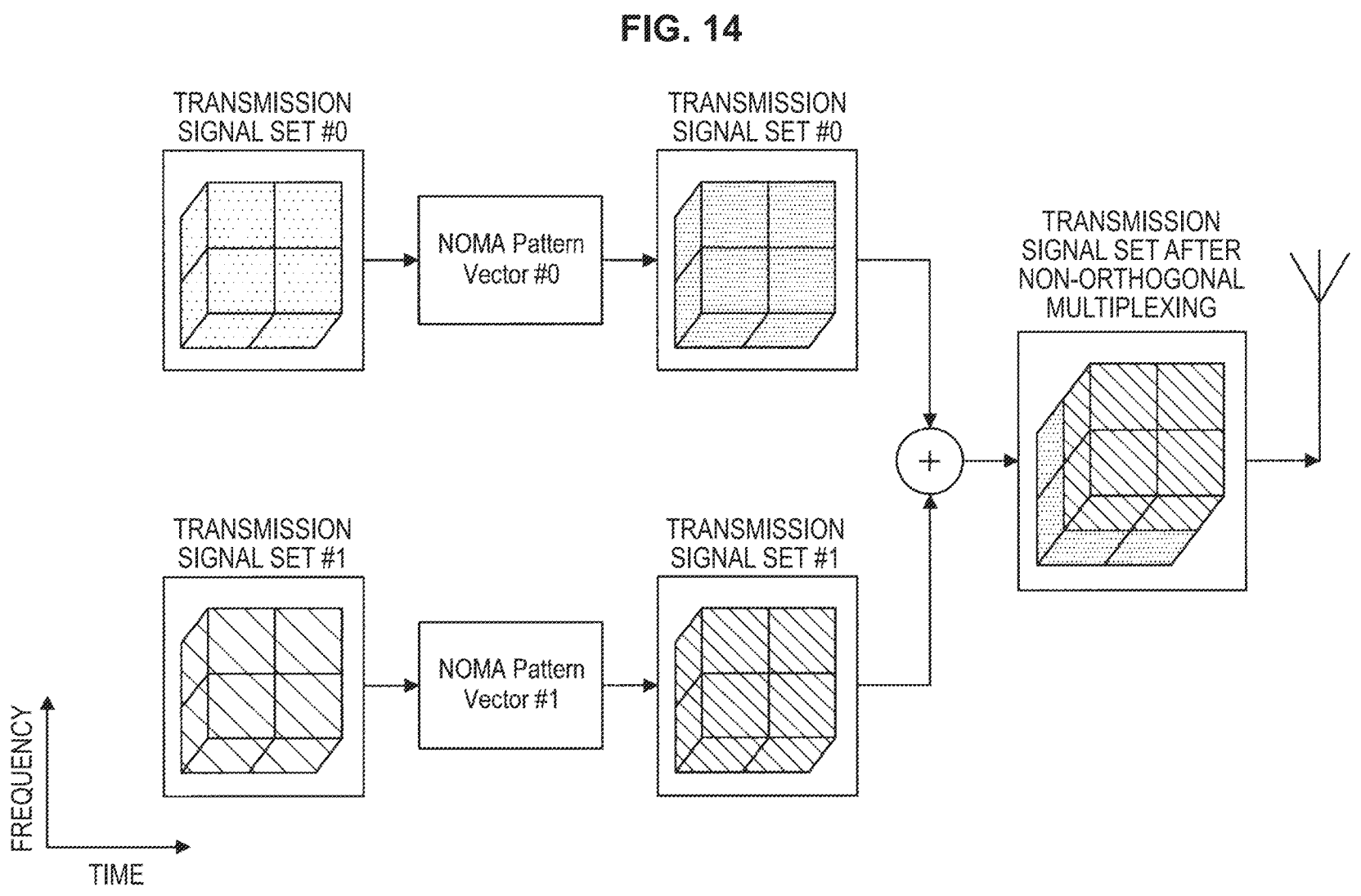

In orthogonal multiple access (OMA), transmission and reception are performed by using a frequency axis and a time axis that intersect at right angles, for example. At this time, a frame configuration of frequency and time resources is decided by a sub carrier interval, and it is not possible to use resources that is equal to or greater than the number of resource elements as illustrated in FIG. 6. Meanwhile, a frame configuration is decided by adding an Interleave pattern V axis, a Spreading Pattern axis, a Scrambling Pattern axis, a Codebook axis, a Power axis, and the like, for example, that are non-orthogonal axes in addition to the frequency axis and the time axis that intersect at right angles. For example, FIG. 14 illustrates a case in which transmission signals are multiplexed with non-orthogonal axes in a transmission device and all resources multiplexed with the non-orthogonal axes are the same parameter set. Here, the transmission device represents either the base station device 1 or the terminal device 2. The transmission device prepares a plurality of transmission signal sets to be multiplexed. In FIG. 14, two transmission signal sets are assumed to be multiplexed. Although the number of transmission signal sets is two here, the number of transmission signal sets may be three or more. Also, the respective transmission signal sets may be transmission signals directed to different reception devices or may be transmission signals directed to the same reception device. Here, the reception device represents either the base station device 1 or the terminal device 2. Corresponding NOMA pattern vectors are applied to the respective transmission signal sets. Here, Interleave Pattern, Spreading Pattern, Scrambling Pattern, Codebook, Power Allocation, and the like are included in NOMA Pattern Vector, for example. Signals after the application of NOMA Pattern Vector are multiplexed on the same frequency and time resources and are then sent to the same antenna port. Also, although the transmission signal sets of the same parameter sets are multiplexed in FIG. 14, transmission signal sets of different parameter sets may be multiplexed.

Figure 15:
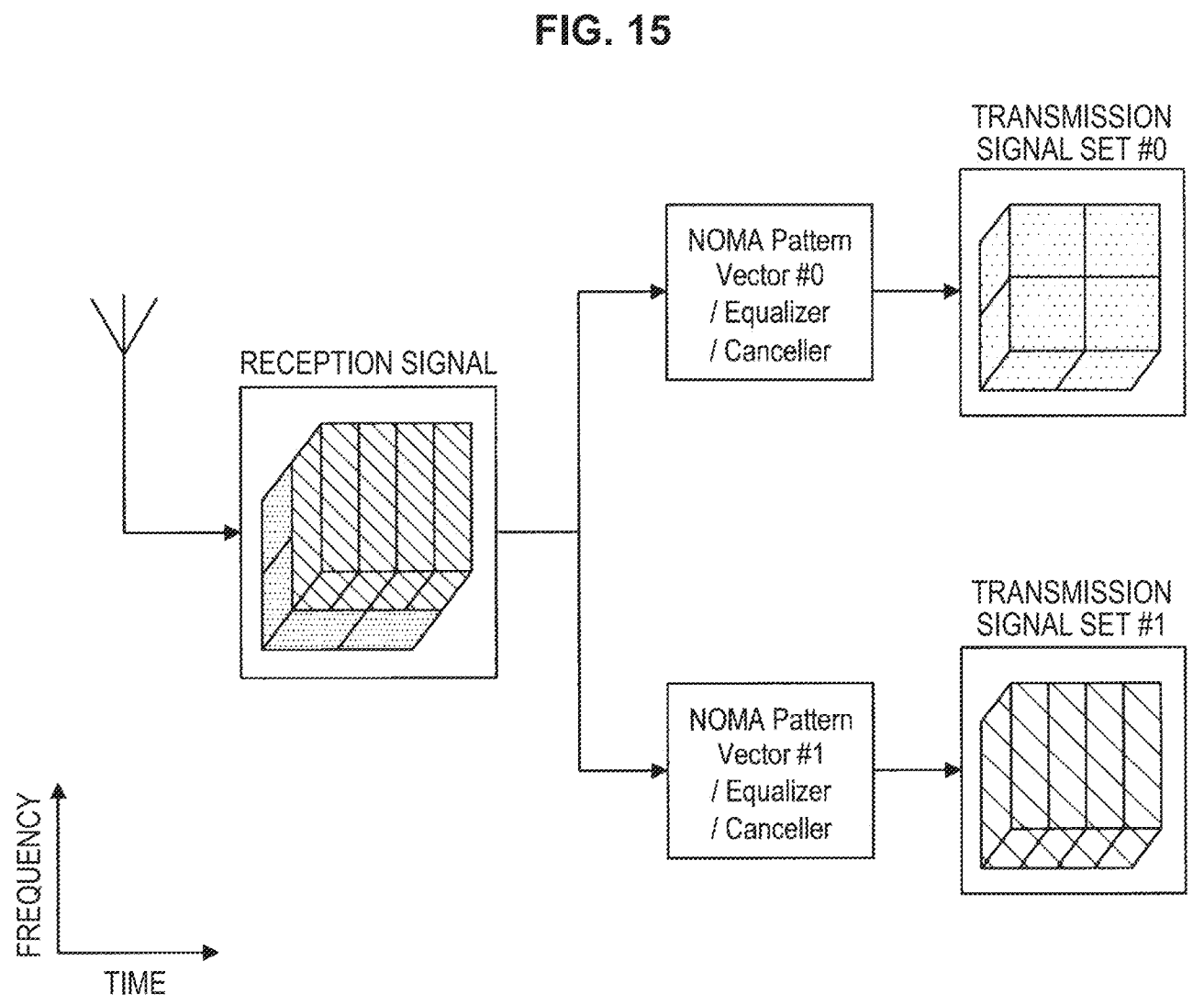

FIG. 15 illustrates an example of the reception device. As illustrated in FIG. 15, a reception signal is received in a state in which a plurality of transmission signals is multiplexed on the same frequency and time resources. The reception device applies NOMA Pattern Vector applied by a transmitter in order to decode the multiplexed transmission signal set and extracts a desired signal through channel equalization and an interference signal canceller. In a case in which the multiplexing has been performed using the same NOMA Pattern Vector at this time, an influence of interference between the multiplexed signals increases, and it becomes difficult to perform the decoding.

As described above, NOMA Pattern Vector applied by the transmission device and the reception device needs to be shared between the transmission device and the reception device in NOMA transmission and to be applied without overlapping.

2. TECHNICAL PROBLEMS

Figure 16:
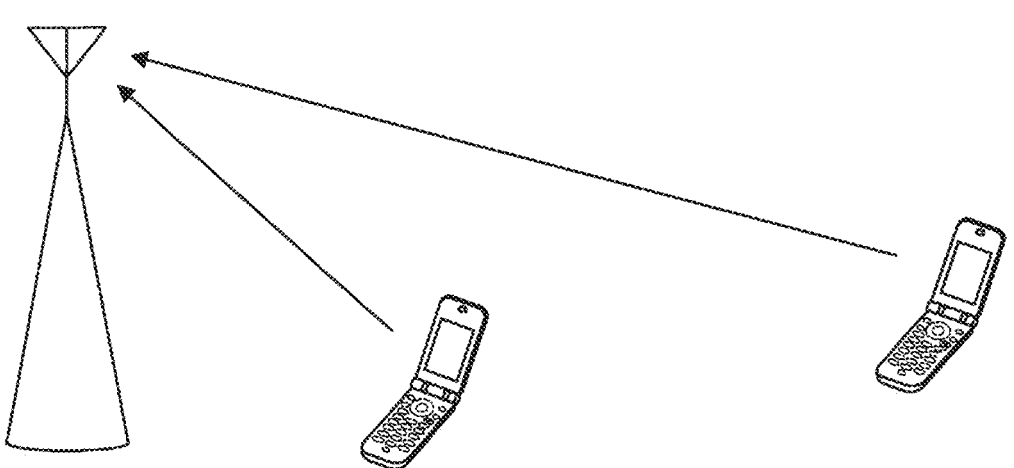
FIG. 16 is a diagram for describing a technical problem according to the present embodiment.
Figure 17:
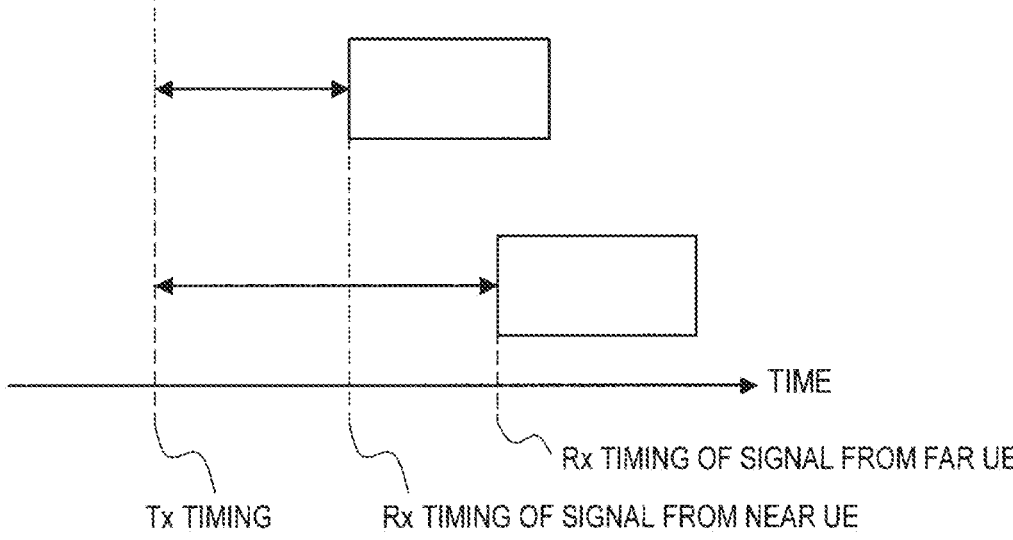
FIG. 17 is a diagram for describing a technical problem according to the present embodiment.

Hereinafter, technical problems related to the present embodiment will be described in detail with reference to FIGS. 16 and 17. FIGS. 16 and 17 are diagrams for describing technical problems related to the present embodiment.

A situation in which a plurality of terminal devices is present at different distances to a base station device is assumed as illustrated in FIG. 16, and influences of propagation delay will be described. In uplink transmission, propagation delay occurs in transmission signals from the terminal devices in accordance with the distances to the base station device. Therefore, in a case in which the plurality of terminal devices at different distances to the base station device transmit transmission signals at the same time as illustrated in FIG. 17, reception timings thereof at the base station device differ due to the propagation delay occurring in accordance with the distances to the base station device. In detail, a reception timing of a transmission signal from a terminal device at a close distance to the base station device is earlier than a reception timing of a transmission signal from a terminal device at a far distance to the base station device by a time in accordance with a difference between the distances. In addition, since the respective transmission signals interfere with each other in a case in which the difference between the reception times of the respective transmission signals exceeds a cyclic prefix (CP), the interference affects transmission properties.

As one method for alleviating or avoiding such influences on the transmission properties, control (for example, the aforementioned timing advance) of transmission timings using PRACH can be considered.

As described above, it is desirable to provide a technology for supporting various use cases related to timings of communication performed between the communication apparatuses in NR. Thus, the present embodiment proposes an extended timing advance technology that can be introduced to NR.

3. TECHNICAL FEATURES

3.1. Configuration Example of Higher Layer Processing Unit

First, more detailed configuration examples of the base station device 1 and the terminal device 2 according to the present embodiment will be described with reference to FIGS. 18 and 19.

Figure 18:
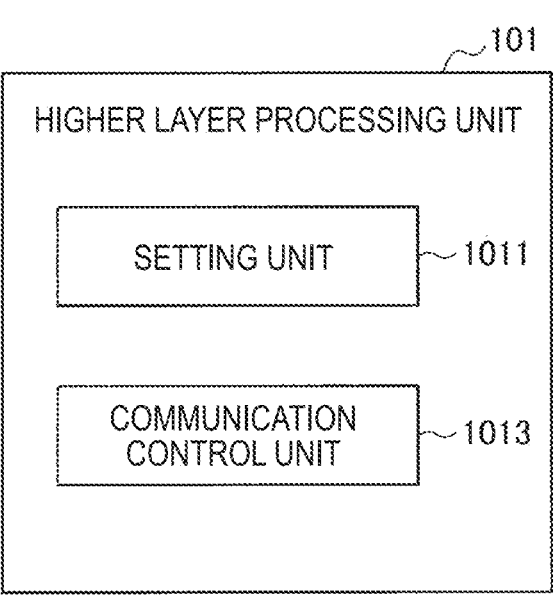
FIG. 18 is a block diagram illustrating an example of a theoretical configuration of a control unit of a base station device according to the present embodiment.

FIG. 18 is a block diagram illustrating an example of a theoretical configuration of the higher layer processing unit 101 of the base station device 1 according to the present embodiment. As illustrated in FIG. 18, the higher layer processing unit 101 of the base station device 1 according to the present embodiment includes a setting unit 1011 and a communication control unit 1013. The setting unit 1011 has a function of setting a control mode of the communication control unit 1013. The communication control unit 1013 has a function of controlling communication with the terminal device 2 on the basis of setting performed by the setting unit 1011. Functions of the setting unit 1011 and the communication control unit 1013 will be described later in detail.

Figure 19:
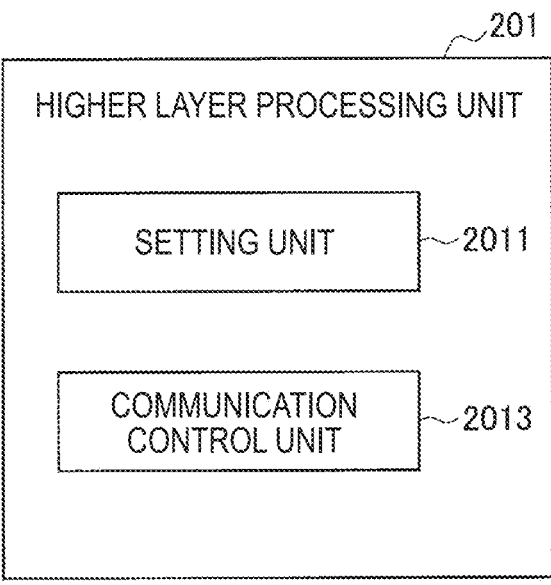
FIG. 19 is a block diagram illustrating an example of a theoretical configuration of a control unit of a terminal device according to the present embodiment.

FIG. 19 is a block diagram illustrating an example of a theoretical configuration of the higher layer processing unit 201 of the terminal device 2 according to the present embodiment. As illustrated in FIG. 19, the higher layer processing unit 201 of the terminal device 2 according to the present embodiment includes a setting unit 2011 and a communication control unit 2013. The setting unit 2011 has a function of setting a control mode of the communication control unit 2013. The communication control unit 2013 has a function of controlling communication with the base station device 1 on the basis of setting performed by the setting unit 2011. Functions of the setting unit 2011 and the communication control unit 2013 will be described later in detail.

Note that each of the higher layer processing unit 101 and the higher layer processing unit 201 may be realized as a processor, a circuit, an integrated circuit, or the like.

3.2. Frame Configuration of NR

In NR, a suitable frame configuration can be employed in accordance with supported use cases. The frame configuration includes a configuration for downlink transmission and uplink transmission corresponding to the downlink transmission.

Figure 20:
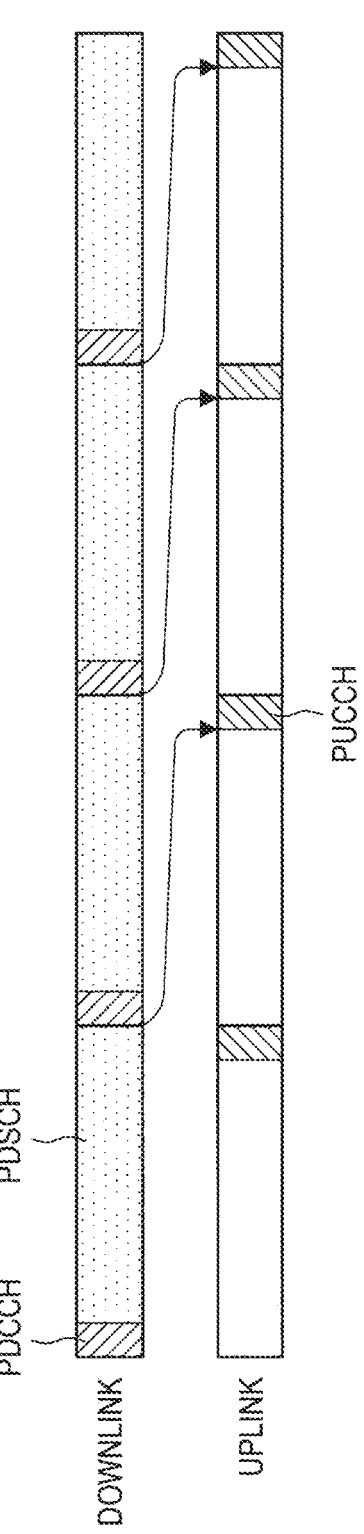
FIG. 20 is a diagram illustrating a configuration example of non-self-contained sub frames in a case of PDSCH transmission.

FIG. 20 illustrates a configuration example of non-self-contained sub frames in a case of PDSCH transmission. FIG. 20 illustrates four sub frames in downlink and uplink. In the downlink, the respective sub frames include PDCCH and PDSCH. In the uplink, the respective sub frames include PUCCH. The PDCCH is transmitted with information related to scheduling of the PDSCH in the sub frame or in a following sub frame included therein. The PUCCH is transmitted with information for reporting HARQ-ACK for the PDSCH transmitted in a downlink sub frame before the uplink sub frame included therein.

Note that, although the HARQ-ACK for the PDSCH in the immediately previous subframe is reported by the PUCCH in FIG. 20, the HARQ-ACK is not limited thereto and can be reported by the PUCCH in a sub frame later than the sub frame for receiving the PDSCH by a predetermined number. The predetermined number may be defined in advance or may be set uniquely to the terminal or uniquely to the base station.

Figure 21:
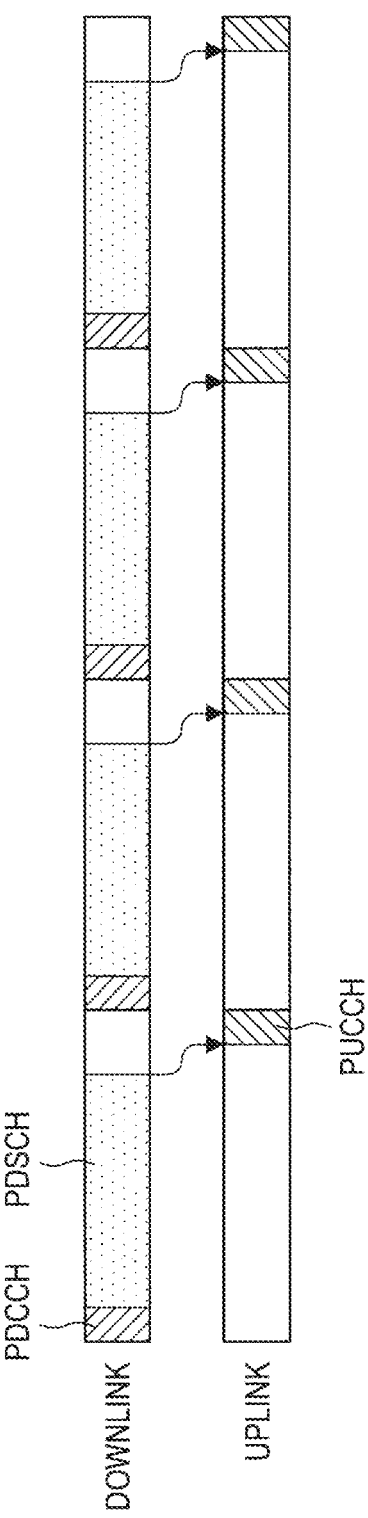
FIG. 21 is a diagram illustrating a configuration example of self-contained sub frames in a case of PDSCH transmission.

FIG. 21 illustrates a configuration example of self-contained sub frames in a case of PDSCH transmission. FIG. 21 illustrates four sub frames in downlink and uplink. In the downlink, the respective sub frames include PDCCH and PDSCH.

In the uplink, the respective sub frames include PUCCH. The PDCCH is transmitted with information related to scheduling of the PDSCH in the sub frame or a following sub frame included therein. The PUCCH is transmitted with information for reporting HARQ-ACK for the PDSCH transmitted in the downlink sub frame that is the same as the uplink sub frame included therein.

In the frame configuration in FIG. 21, a transmission time (last symbol) of the PDSCH is decided in consideration of a processing time required before the information for reporting the HARQ-ACK of the PDSCH is generated and a time (symbol) required to transmit the PUCCH.

Although the frame configuration illustrated in FIG. 20 and the frame configuration illustrated in FIG. 21 in the case of the PDSCH transmission (that is, in the case in which the PDCCH provides notification of PDSCH scheduling information) have been described above, various frame configurations can similarly be employed in a case of PUSCH transmission (that is, in a case in which the PDCCH provides a notification of PUSCH scheduling information).

Figure 22:
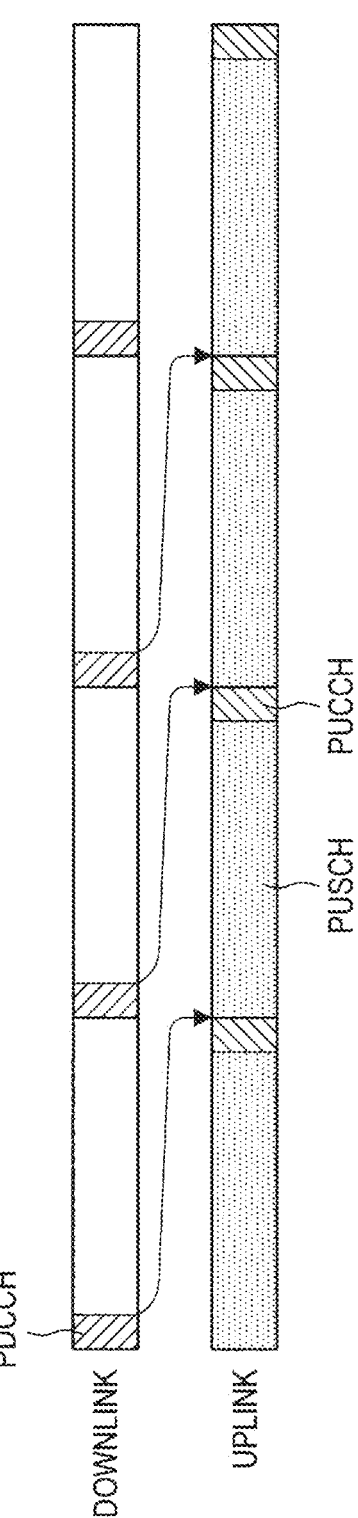
FIG. 22 is a diagram illustrating a configuration example of non-self-contained sub frames in a case of PUSCH transmission.

FIG. 22 illustrates a configuration example of non-self-contained sub frames in a case of PUSCH transmission. FIG. 22 illustrates four sub frames in downlink and uplink. In the downlink, the respective sub frames include PDCCH. In the uplink, the respective sub frames include PUCCH and PUSCH. The PDCCH is transmitted with information related to scheduling of PUSCH in an uplink sub frame following the sub frame included therein.

Note that, although the PUSCH is scheduled by the PDCCH in the immediately previous sub frame in FIG. 22, the PUSCH is not limited thereto and can be scheduled by PDCCH earlier than the uplink sub frame for transmitting the PUSCH by a predetermined number. The predetermined number may be defined in advance or may be set uniquely to the terminal or uniquely to the base station.

Figure 23:
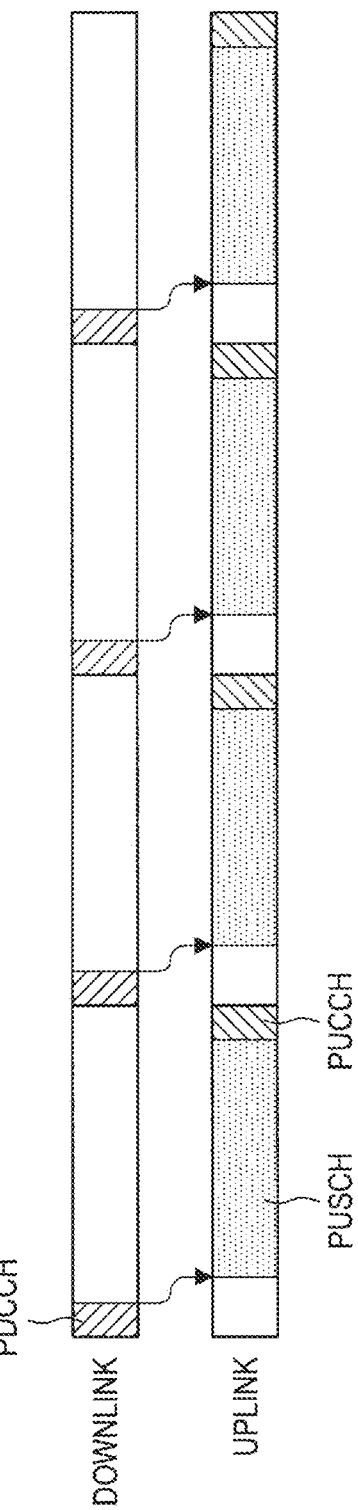
FIG. 23 is a diagram illustrating a configuration example of self-contained sub frames in a case of PUSCH transmission.

FIG. 23 illustrates a configuration example of self-contained sub frames in a case of PUSCH transmission. FIG. 23 illustrates four sub frames in downlink and uplink. In the downlink, the respective sub frames include PDCCH. In the uplink, the respective sub frames include PUCCH and PUSCH. The PDCCH is transmitted with information related to scheduling of the PUSCH in the uplink sub frame included therein.

In the frame configuration in FIG. 23, a transmission time (first symbol) of the PUSCH is decided in consideration of a processing time required before the PUSCH is generated on the basis of scheduling of the PDCCH and a time (symbol) required to transmit the PDCCH.

Note that although the case of the PDSCH transmission as illustrated in FIGS. 20 and 21 will be described in the following description, similar description can also be applied to the case of the PUSCH transmission as illustrated in FIGS. 22 and 23. Therefore, technologies and content in relation to the PDSCH transmission can be replaced with those in relation to the PUSCH transmission unless particularly indicated otherwise.

Also, the last symbol of the PDSCH occurs before the last symbol of its downlink sub frame in the frame configuration illustrated in FIG. 21. In its downlink sub frame, nothing may be transmitted or another downlink channel and/or a downlink signal may be transmitted as a symbol after the last symbol of the PDSCH (hereinafter, also referred to as a downlink GAP region).

For example, the downlink GAP region is used to map PBCH for transmitting a master information block (MIB), PDSCH for transmitting a system information block (SIB), or a channel for providing notifications to the plurality of terminal devices. Also, the downlink GAP region is used to transmit a synchronization signal such as PSS or SSS, a detection signal (discovery signal) used to perform RRM measurement, and CSI-RS used to perform CSI measurement, for example.

In addition, the first symbol of the PUSCH in the frame configuration illustrated in FIG. 23 occurs after the first symbol of its uplink sub frame. In its uplink sub frame, nothing may be transmitted or another uplink channel and/or an uplink signal may be transmitted as a symbol before the first symbol of the PUSCH (hereinafter, also referred to as an uplink GAP region).

For example, the uplink GAP region can be used to map sounding RS for measuring a transmission path state of the uplink, DMRS for the PUSCH transmitted in its uplink sub frame, PUCCH for transmitting predetermined uplink control information (UCI), PUCCH for reporting HARQ-ACK for PDSCH transmitted in the previous downlink sub frame, and the like.

In addition, although FIGS. 20 to 23 have been described as different drawings in the aforementioned description, these frame configurations can be used in combination with each other (at the same time). That is, it is possible to transmit a plurality of PDCCHs in a multiplexed manner by a predetermined method, and PDSCH transmission and/or PUSCH transmission is performed in accordance with downlink control information (DCI) provided by the PDCCHs as notifications.

For example, either a non-self-contained sub frame or a self-contained sub frame can be employed for both the PDSCH transmission and the PUSCH transmission. That is, FIGS. 20 and 22 can be used at the same time, and FIGS. 21 and 23 can be used at the same time.

Also, the non-self-contained sub frame or the self-contained sub frame can differ in each of the PDSCH transmission and the PUSCH transmission, for example. That is, FIGS. 20 and 23 can be used at the same time, and FIGS. 21 and 22 can be used at the same time.

Note that, since it is assumed that different frequency bands are used for LTE and NR, for example, collision of regions for transmitting HARQ-ACK between LTE and NR is avoided. Also, even if the used frequency bands overlap between LTE and NR, it is possible to avoid the collision by dividing regions for transmitting HARQ-ACK (using different RBs or the like, for example) between LTE and NR.

Hereinafter, differences between the non-self-contained sub frame (that is, the frame configuration illustrated in FIG. 20 or the frame configuration illustrated in FIG. 22) and the self-contained sub frame (that is, the frame configuration illustrated in FIG. 21 or the frame configuration illustrated in FIG. 22) described above will be described.

One of the differences relates to a time required before information for reporting HARQ-ACK for PDSCH is generated after the PDSCH is received, in relation to the PDSCH. Also, one of the differences relates to a time required before uplink data for transmitting PUSCH scheduled with PDCCH is generated after the PDCCH is received, in relation to the PUSCH.

In a case of a self-contained sub frame, since one sub frame is completed with a report of PDSCH and HARQ-ACK included therein or PDCCH and PUSCH included therein, it is possible not to affect transmission and reception of other sub frames. In addition, in the case of the self-contained sub frame, since a processing time required before HARQ-ACK is generated after PDSCH is received or a processing time required before PUSCH is generated after PDCCH is received is shorter than that in a case of a non-self-contained sub frame, a processing burden of the terminal device 2 is relatively large.

Meanwhile, in the case of the non-self-contained sub frame, since the processing time required before HARQ-ACK is generated after PDSCH is received or the processing time required before PUSCH is generated after PDCCH is received is longer than that in the case of the self-contained sub frame, the processing burden of the terminal device 2 is relatively small. In addition, in the case of the non-self-contained sub frame, utilization of an uplink sub frame is decided in consideration of a sub frame for reporting HARQ-ACK or a sub frame for transmitting PUSCH.

Therefore, which of the sub frames is to be employed may be set uniquely to the terminal device 2 or uniquely to the base station device 1 in accordance with processing ability of the terminal device 2 or use cases or the like supported by the base station device 1.

3.3. Transmission Timing Control (1) Timing Advance Time

The terminal device 2 (for example, the communication control unit 2013) controls a transmission timing of a sub frame transmitted to another communication apparatus (for example, the base station device 1), which is a communication counterpart. Hereinafter, technical features related to transmission timing control will be described on the assumption of a case in which a self-contained sub frame is employed. It is a matter of course that these technical features can be similarly applied to a case in which a non-self-contained sub frame is employed.

For example, the terminal device 2 performs transmission of an i-th wireless frame in the uplink at a timing that is caused to be offset with reference to a corresponding i-th wireless frame in the downlink. An offset time will also be referred to as a timing advance time below. The timing advance time can also be regarded as an interval between a reception start timing of the downlink sub frame and a transmission start timing of the uplink sub frame. The timing advance time $T_{TA}$ can be provided by the following equation.

[Math. 1]

$$T_{TA}=(N_{TA}+N_{TAoffset})\times T_s \tag{1}$$

$T_s$ is, for example, a value decided on the basis of a sampling frequency. For example, $T_s$ may be a value obtained by dividing 10 milliseconds by 307200.

$N_{TA}$ is a parameter unique to the terminal device 2 (corresponding to a first parameter). $N_{TA}$ is a value that is dynamically set and is provided as a notification uniquely to the terminal device 2. For example, $N_{TA}$ is set on the basis of a timing advance (TA) command set or provided as a notification by the base station device 1. The TA command can be provided as a notification as MAC layer control information. In addition, the TA command may be provided as a notification while being included in random access response control information.

$N_{TA}$ is an integer that is equal to or greater than zero and that is equal to or less than a predetermined value. The maximum value that can be employed as $N_{TA}$ is defined in advance. For example, the maximum value that can be employed as $N_{TA}$ is 20512. Also, the maximum value that can be employed as $N_{TA}$ may be decided in accordance with a type of a frame configuration. For example, the maximum value in a case of a self-contained sub frame may be smaller than the maximum value in a case of a non-self-contained sub frame. This is because a transmission timing of the uplink sub frame becomes earlier with an increase in $N_{TA}$ and an increase in a timing advance time. In more detail, in a case in which, for example, the self-contained sub frame illustrated in FIG. 21 is employed, the short processing time for generating HARQ-ACK becomes shorter with an increase in the timing advance time. Therefore, in the case in which the self-contained sub frame is employed, it is desirable that the maximum value of $N_{TA}$ be set such that at least a minimum processing time during which HARQ-ACK can be generated is secured.

$N_{TAoffset}$ is a parameter unique to the base station device 1 (corresponding to a second parameter). $N_{TAoffset}$ is a value that depends on setting unique to the base station device 1 and is statically (that is, fixedly) or quasi-statically set. For example, $N_{TAoffset}$ is set on the basis of a duplex scheme such as FDD or TDD or a parameter or the like set by the base station device 1.

(2) Control Mode

The terminal device 2 (for example, the setting unit 2011) sets a control mode related to control of a transmission timing to a backward mode (corresponding to a first mode) or a forward mode (corresponding to a second mode).

Then, the terminal device 2 (for example, the communication control unit 2013) controls communication with the base station device 1 in accordance with the set control mode. For example, the terminal device 2 controls a transmission timing of a second sub frame that is transmitted from the terminal device 2 to another communication apparatus and corresponds to the first sub frame with reference to a first sub frame transmitted from the aforementioned other communication apparatus, which is a communication counterpart, to the terminal device 2 in accordance with the set control mode. The aforementioned other terminal device 2, which is a communication counterpart, is the base station device 1, for example. In that case, the first sub frame is a downlink sub frame while the second sub frame is an uplink sub frame. Also, the fact that the first sub frame and the second sub frame correspond to each other means that the frame numbers are the same or corresponding numbers, for example.

In addition, the terminal device 2 controls communication with the base station device 1 in accordance with various kinds of setting. For example, the terminal device 2 controls communication with the base station device 1 by FDD or TDD.

The base station device 1 (for example, the setting unit 1011) sets a control mode of a transmission timing of a sub frame that is transmitted from the terminal device 2 to the base station device 1 in another communication apparatus (for example, the terminal device 2), which is a communication counterpart, to the first mode or the second mode. In more detail, the base station device 1 provides a notification of setting information indicating a control mode to be set, that is, setting information indicating which control mode, namely either the first mode or the second mode, is to be set. The terminal device 2 sets one of the control modes on the basis of the setting information received from the base station device 1.

In addition, the base station device 1 (for example, the communication control unit 1013) controls communication with the terminal device 2 in accordance with the set control mode of the terminal device 2. In more detail, the base station device 1 performs reception processing of a sub frame that is received from the terminal device 2 at a timing in accordance with the control mode.

In addition, the base station device 1 controls communication with the terminal device 2 in accordance with various kinds of setting. For example, the base station device 1 controls communication with the terminal device 2 by FDD or TDD.

Hereinafter, the forward mode and the backward mode will be described in detail.

Forward Mode

A transmission timing in the forward mode (corresponding to the second mode) can also be referred to as a second transmission timing. The second transmission timing is a transmission timing in a case in which adjustment of the transmission timing based on the distance between the base station device 1 and the terminal device 2 or propagation delay (that is, timing advance) is performed forward with reference to (that is, temporally before) the downlink sub frame.

In a case in which the forward mode is set, the terminal device 2 (for example, the communication control unit 2013) transmits an uplink sub frame corresponding to the downlink sub frame before the downlink sub frame. That is, the terminal device 2 performs transmission of the i-th wireless frame in the uplink earlier than the corresponding i-th wireless frame in the downlink as a reference by a timing advance time $T_{TA}$. In this manner, the transmission start timing of the uplink sub frame is positioned before the reception start timing of the downlink sub frame.

Hereinafter, transmission and reception timings of the respective channels in the forward mode will be described with reference to FIG. 24.

Figure 24:
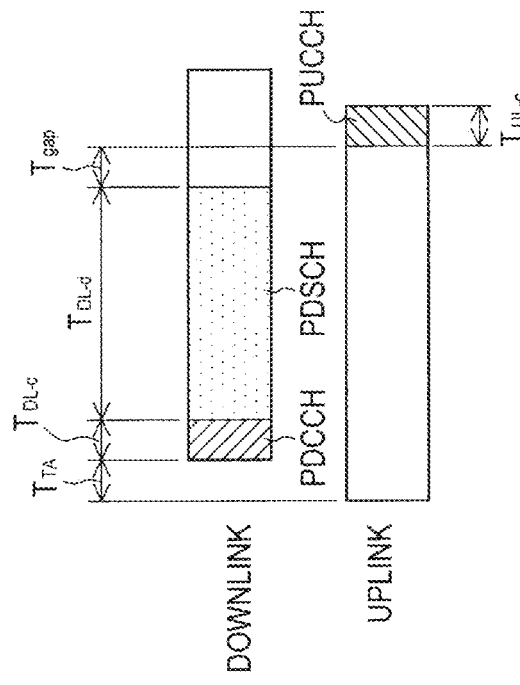
FIG. 24 is a diagram for describing a forward mode according to the present embodiment.

FIG. 24 is a diagram for describing the forward mode according to the present embodiment. FIG. 24 illustrates a reception timing of the downlink sub frame and a transmission timing of the uplink sub frame in the terminal device 2 in a case in which FDD, the forward mode, and the self-contained sub frame are employed. As illustrated in FIG. 24, the downlink sub frame and the uplink sub frame at least partially overlap in a time region. In addition, channel or signal transmission is performed except for a transmission and reception switching period $T_{gap}$ in either the downlink sub frame or the uplink sub frame in the overlapping time region. $T_{DL-c}$ represents a PDCCH transmission time (that is, the number of transmission symbols). $T_{DL-d}$ represents a PDSCH transmission time (that is, the number of transmission symbols). $T_{UL-c}$ represents a PUCCH transmission time (that is, the number of transmission symbols). $T_{UL-d}$ represents a PUSCH transmission time (that is, the number of transmission symbols). $T_{TA}$ represents a timing advance time. $T_{gap}$ represents a switching interval (that is, a gap) between channel transmission in the downlink sub frame and channel transmission in the uplink sub frame.

The left diagram in FIG. 24 is an example in which PDCCH and PDSCH are transmitted through downlink transmission and PUCCH is transmitted through uplink transmission. As illustrated in the drawing, the last symbol of a data channel of the downlink sub frame is arranged before the first symbol of a control channel of the uplink sub frame. In the drawing, $T_{gap}$ represents a time from the last symbol of PDSCH to the first symbol of PUCCH.

The right diagram in FIG. 24 is an example in which PDCCH is transmitted through downlink transmission and PUSCH and PUCCH are transmitted through uplink transmission. As illustrated in the drawing, the last symbol of a control channel of the downlink sub frame is arranged before the first symbol of a data channel of the uplink sub frame. In the drawing, $T_{gap}$ represents a time from the last symbol of PDCCH to the first symbol of PUSCH.

The base station device 1 (for example, the communication control unit 1013) processes, in an associated manner, the downlink sub frame and the uplink sub frame that is transmitted before the downlink sub frame and corresponds to the downlink sub frame in a case in which the forward mode is set. In relation to the self-contained sub frame, for example, the base station device 1 acquires HARQ-ACK for PDSCH of the downlink sub frame from PUCCH of the corresponding uplink subframe. Also, in relation to the self-contained sub frame, the base station device 1 acquires PUSCH transmitted on the basis of scheduling information included in the PDCCH of the downlink sub frame from the corresponding uplink sub frame.

Backward Mode

A transmission timing in the backward mode (corresponding to a first mode) can also be referred to as a first transmission timing. The first transmission timing is a transmission timing in a case in which adjustment of a transmission timing based on the distance between the base station device 1 and the terminal device 2 or propagation delay (that is, timing advance) is performed backward with reference to (that is, temporally after) the downlink sub frame.

In a case in which the backward mode is set, the terminal device 2 (for example, the communication control unit 2013) transmits the uplink sub frame corresponding to the downlink sub frame after the downlink sub frame. That is, the terminal device 2 performs transmission of the i-th wireless frame in the uplink later than the corresponding i-th wireless frame in the downlink as a reference by the timing advance time $T_{TA}$. In this manner, the transmission start timing of the uplink sub frame is positioned after the reception start timing of the downlink sub frame.

Hereinafter, transmission and reception timings of the respective channels in the backward mode will be described with reference to FIG. 25.

Figure 25:
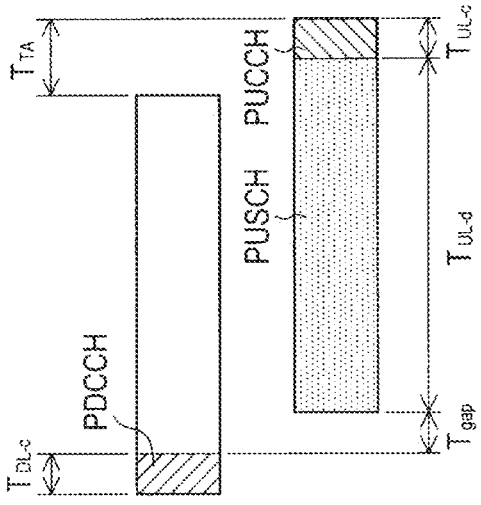
FIG. 25 is a diagram for describing a backward mode according to the present embodiment.
Figure 25:
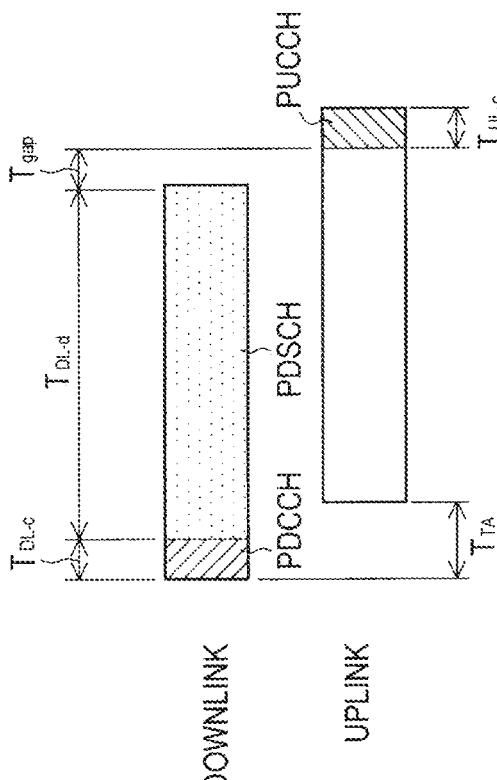

FIG. 25 is a diagram for describing the backward mode according to the embodiment. FIG. 25 illustrates a reception timing of the downlink sub frame and a transmission timing of the uplink sub frame in the terminal device 2 in a case in which FDD, the backward mode, and the self-contained sub frame are employed. As illustrated in FIG. 25, the downlink sub frame and the uplink sub frame at least partially overlap in a time region. In addition, channel or signal transmission is performed except for the transmission and reception switching period $T_g a_p$ in either the downlink sub frame or the uplink sub frame in the overlapping time region. $T_{DL-c}$ represents a PDCCH transmission time (that is, the number of transmission symbols). $T_{DL-d}$ represents a PDSCH transmission time (that is, the number of transmission symbols). $T_{UL-c}$ represents a PUCCH transmission time (that is, the number of transmission symbols). $T_{UL-d}$ represents a PUSCH transmission time (that is, the number of transmission symbols). $T_{TA}$ represents a timing advance time. $T_{gap}$ represents a switching interval (that is, a gap) between channel transmission in the downlink sub frame and channel transmission in the uplink sub frame.

The left diagram in FIG. 25 is an example in which PDCCH and PDSCH are transmitted through downlink transmission and PUCCH is transmitted through uplink transmission. As illustrated in the drawing, the last symbol of the downlink sub frame is arranged before the first symbol of a control channel of the uplink sub frame. In the drawing, $T_{gap}$ represents a time from the last symbol of PDSCH to the first symbol of PUCCH.

The right diagram in FIG. 25 is an example in which PDCCH is transmitted through downlink transmission and PUSCH and PUCCH are transmitted through uplink transmission. As illustrated in the drawing, the last symbol of a control channel of the downlink sub frame is arranged before the first symbol of the uplink sub frame. In the drawing, $T_{gap}$ represents a time from the last symbol of PDCCH to the first symbol of PUSCH.

The base station device 1 (for example, the communication control unit 1013) processes, in an associated manner, the downlink sub frame and the uplink sub frame that is transmitted after the downlink sub frame and corresponds to the downlink sub frame in a case in which the backward mode is set. In relation to the self-contained sub frame, for example, the base station device 1 acquires HARQ-ACK for PDSCH of the downlink sub frame from PUCCH of the corresponding uplink sub frame. In addition, in relation to the self-contained sub frame, the base station device 1 acquires PUSCH transmitted on the basis of scheduling information included in PDCCH of the downlink sub frame from the corresponding uplink sub frame.

Timing Advance Time Control

The base station device 1 (for example, the communication control unit 1013) controls a timing advance time.

In more detail, the base station device 1 recognizes propagation delay on the basis of uplink transmission (for example, a random access channel, a sounding reference signal, or the like) from the terminal device 2 and decides $N_{TA}$ for causing a timing advance time to be set in accordance with the propagation delay. Then, the base station device 1 provides a notification of decided $N_{TA}$ to the terminal device 2.

Meanwhile, $N_{TAoffset}$ may be defined in advance in accordance with the communication scheme or parameters related to communication. For example, $N_{TAoffset}$ may be 0 in a case in which the duplex scheme is FDD while $N_{TAoffset}$ may be 624 in a case in which the duplex scheme is TDD. In addition, a predetermined value can be set as $N_{TAoffset}$ in a case in which a time for switching between the uplink and the downlink is necessary.

In this manner, the base station device 1 dynamically controls the timing advance time by providing the notification of $N_{TA}$.

The terminal device 2 (for example, the communication control unit 2013) dynamically sets the timing advance time on the basis of the notification from the base station device 1. In detail, the terminal device 2 controls a transmission timing in accordance with $N_{TA}$ based on the TA command provided as a notification from the base station device 1 and the timing advance time calculated from $N_{TAoffset}$ defined in advance. The terminal device 2 can match the reception timing on the side of the base station device 1 by performing adjustment of the transmission timing using the timing advance time unique to the terminal device 2 regardless of which of the aforementioned forward mode and the backward mode is set. Therefore, in the case in which dynamic timing advance time setting is performed, an orthogonal access scheme such as OFDMA or SC-FDMA is preferable as the uplink access scheme.

Meanwhile, the terminal device 2 may statically or quasi-statically sets the timing advance time in the backward mode. For example, the terminal device 2 sets $N_{TA}$ to zero and sets the timing advance on the basis only of $N_{TAoffset}$ that is statically or quasi-statically defined. In addition, the terminal device 2 may control the timing advance time (that is, $T_{TA}$) on the basis of the number of symbols (that is, $T_{DL-c}$ or $T_{UL-c}$) of a control channel of the downlink sub frame or the uplink sub frame and the switching interval (that is, $T_{gap}$) between reception of a channel in the downlink sub frame and transmission of a channel in the uplink sub frame. For example, the terminal device 2 may set $T_{TA}$ as $T_{UL-c}+T_{gap}$ in the example illustrated in the left diagram in FIG. 25. Also, the terminal device 2 may set $T_{TA}$ as $T_{DL-c}$ $T_{gap}$ in the example illustrated in the right diagram in FIG. 25. In this manner, it is possible to at least secure a processing time (for example, $T_{gap}$ or a predetermined time that is shorter than $T_{gap}$) required before the aforementioned information for reporting HARQ-ACK of PDSCH is generated in relation to the left diagram in FIG. 25, for example.

However, in a case in which static or quasi-static setting is performed, it is difficult to perform adjustment in accordance with propagation delay based on the distance between the base station device 1 and the terminal device 2 since the adjustment of the transmission timing using parameters specific to the terminal device 2 is not performed. That is, it is difficult to match reception timings at the base station device 1 among transmission signals from a plurality of terminal devices 2 at different distances from the base station device 1. Therefore, in the case in which static or quasi-static setting is performed, a non-orthogonal access scheme such as interleaved division multiple access (IDMA) and sparse code multiple access (SCMA) is suitable as the uplink access scheme. Accordingly, the terminal device 2 communicates with the base station device 1 using the non-orthogonal access scheme in the case in which static or quasi-static setting is performed.

Also, $N_{TAoffset}$ may be set in accordance with the symbol length of PUCCH and/or the processing time required to generate an uplink control channel in the backward mode. The processing time described herein indicates a processing time required before the aforementioned information for reporting HARQ-ACK of PDSCH is generated, for example. This is because a time required before transmission of PUCCH is started after completion of reception of PDSCH changes in accordance with the length of $T_{TA}$. The Terminal device 2 can set $T_{TA}$ such that at least a time corresponding to the processing time is secured, by setting $N_{TAoffset}$ in accordance with the symbol length of the uplink control channel and/or the processing time.

The forward mode and the backward mode have been described above in detail. As described above, the timing of communication as a target of control is the transmission timing of the uplink sub frame with reference to the downlink sub frame in the embodiment.

In Case of TDD

Although the forward mode and the backward mode in the case of FDD have been described above, the control of the transmission timing is similarly performed in a case of TDD. In one example, the forward mode in the case of TDD will be described with reference to FIG. 26.

Figure 26:
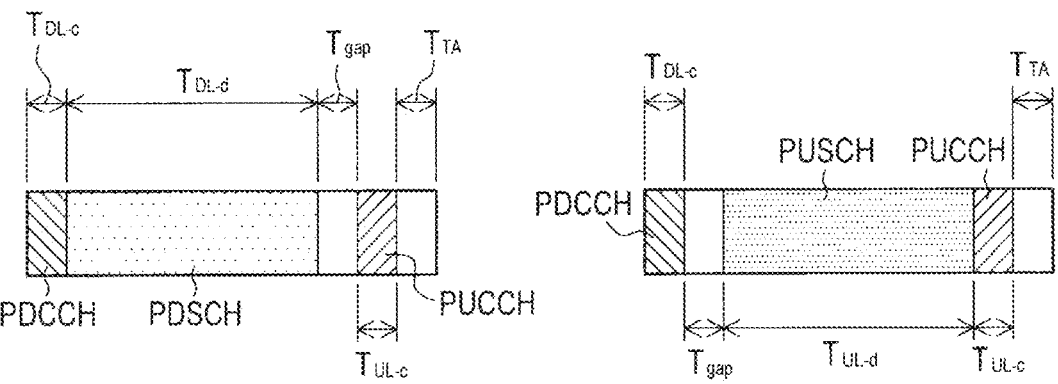
FIG. 26 is a diagram for describing a forward mode according to the present embodiment.

FIG. 26 is a diagram for describing the forward mode according to the present embodiment. FIG. 26 illustrates a reception timing of a downlink sub frame and a transmission timing of an uplink sub frame in the terminal device 2 in a case in which TDD, the forward mode, and the self-contained sub frame are employed. As illustrated in the left diagram in FIG. 26, transmission of PUCCH is performed with a margin of the timing advance time $T_{TA}$ with reference to the sub frame in which corresponding PDSCH is included. In more detail, transmission of PUCCH is performed such that it ends earlier than the last of the sub frame, in which the corresponding PDSCH is included, by the timing advance time $T_{TA}$. Also, as illustrated in the right diagram in FIG. 26, transmission of PUSCH is performed with a margin of the timing advance time $T_{TA}$ with reference to the sub frame in which corresponding PDCCH is included. In more detail, transmission of PUSCH is performed such that transmission of PUCCH ends earlier than the last of the sub frame, in which corresponding PDCCH is included, by the timing advance time $T_{TA}$.

Flow of Processing

Hereinafter, an example of a flow of setting processing of the aforementioned control modes in the wireless communication system will be described with reference to FIG. 27.

Figure 27:
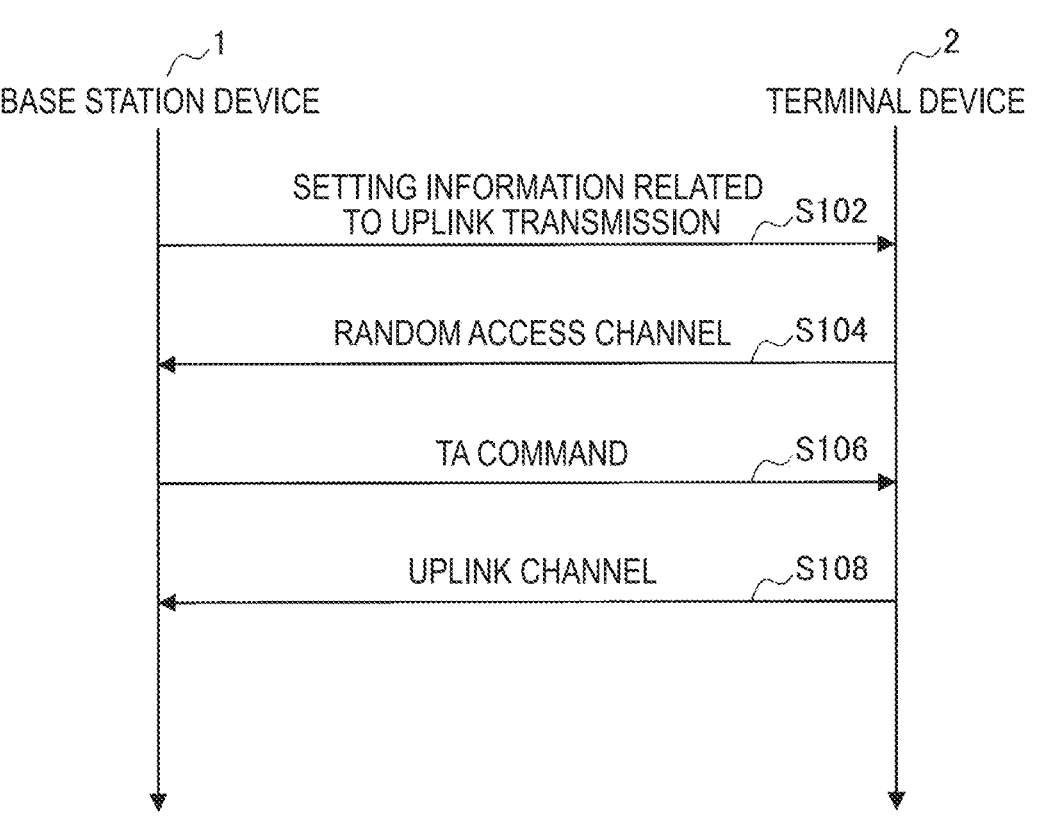
FIG. 27 is a sequence diagram illustrating an example of a flow of control mode setting processing that is executed in a wireless communication system according to the present embodiment.

FIG. 27 is a sequence diagram illustrating an example of a flow of control mode setting processing that is executed in the wireless communication system according to the present embodiment. The base station device 1 and the terminal device 2 are involved in the sequence.

As illustrated in FIG. 27, the base station device 1 transmits setting information related to uplink transmission to the terminal device 2 first (Step S102). The setting information includes information indicating which of the forward mode and the backward mode is to be set, for example. Then, the terminal device 2 transmits a random access channel to the base station device 1 (Step S104). Next, the base station device 1 recognizes a reception timing at the base station device 1 on the basis of the received random access channel, generates a TA command for adjusting the transmission timing at the terminal device 2 that is a transmission source, and transmits the TA command to the terminal device 2 (Step S106). Then, the terminal device 2 sets a timing advance time on the basis of the received TA command and transmits an uplink channel to the base station device 1 at a timing based on the set timing advance time (Step S108).

Note that the uplink transmission for adjusting the transmission timing is not limited to the random access channel. For example, another uplink channel such as a sounding reference signal or the uplink signal may be transmitted for controlling the transmission timing.

The aforementioned processing may be individually performed for the respective cells or parameter sets. That is, the aforementioned control mode in the terminal device 2 can be individually set for the respective cells or parameter sets.

(3) Variations of Setting Method

The terminal device 2 (for example, the setting unit 2011) can employ a variety of setting methods. For example, although the aforementioned description has been made on the assumption that a control mode is explicitly set with the notification of the setting information from the base station device 1 to the terminal device 2, the method of setting a control mode is not limited to such an example. For example, the control mode may be implicitly set on the basis of setting, a state, or the like of the base station device 1 or the terminal device 2.

Also, setting of a control mode may be regarded as switching between the forward mode and the backward mode.

The terminal device 2 (for example, the communication control unit 2013) may reset or take over $N_{TA}$ used in the forward mode in a case in which the control mode is switched from the forward mode to the backward mode. That is, in the backward mode, the terminal device 2 may handle $N_{TA}$ as 0 or may continuously take over the value used in the forward mode.

In addition, the terminal device 2 may control a time required before setting of a control mode becomes valid. For example, the terminal device 2 may set a time required before setting becomes valid (that is, timing advance is performed) after the control mode is set to be a predetermined time or may be set separately. In addition, the time required before the setting becomes valid may be set in units of sub frames, for example.

Also, the forward mode and the backward mode described above may be individually set for the respective predetermined channels or the respective predetermined channels. For example, PUCCH may be transmitted in the forward mode while PUSCH may be transmitted in the backward mode. In addition, a noncyclic (aperiodic) channel or signal that is dynamically scheduled by PDCCH may be transmitted in the forward mode while cyclic (periodic) channel or signal set by RRC signaling may be transmitted in the backward mode.

Examples of Setting References

Hereinafter, examples of setting references of a control mode will be described.

For example, the control mode may be set uniquely to the base station device 1 or uniquely to the terminal device 2 in accordance with processing ability of the terminal device 2 or use cases or the like that the base station device 1 supports. The terminal device 2 may support only a predetermined control mode. For example, the terminal device 2 that does not support a self-contained sub frame may support only the forward mode (that is, only the forward mode can be set). Also, the terminal device 2 that supports a self-contained sub frame may support the forward mode and the backward mode.

For example, the control mode may be set in accordance with information of the terminal device 2. Specifically, the control mode may be set to the forward mode or the backward mode on the basis of whether or not a condition of the terminal device 2 is a predetermined condition, a state of the terminal device 2, an application that operates on the terminal device 2, a use case, and/or setting content.

For example, there may be default setting of the control mode, and the control mode may be switched as needed. Specifically, the forward mode may be set as the control mode by default, and the backward mode may be set in a case in which a predetermined condition is satisfied. The predetermined condition includes reception of setting information indicating that the backward mode is to be set from the base station device 1, for example. For example, the terminal device 2 operates in the forward mode until the backward mode is set and operates in the backward mode after the backward mode is set.

For example, the control mode may be set in accordance with ability of the base station device 1. Specifically, the forward mode is set as the control mode at the time of initial access from the terminal device 2, and the backward mode may be set in a case in which connection to the base station device 1 that supports the backward mode is established.

For example, the control mode may be set in accordance with an RRC state. Specifically, the forward mode may be set as the control mode in the RRC connected state while the backward mode may be set in an RRC idle state. In an opposite manner, the forward mode may be set as the control mode in the RRC idle state while the backward mode may be set in the RRC connected state.

For example, the control mode may be set in accordance with an access scheme. Specifically, the forward mode may be set as the control mode in a case in which uplink transmission is performed by an orthogonal access scheme while the backward mode may be set in a case in which uplink transmission is performed by a non-orthogonal access scheme. For example, the terminal device 2 sets usage of the orthogonal access scheme or the non-orthogonal access scheme on the basis of RRC signaling and implicitly sets the control mode in accordance with the setting.

For example, the control mode may be set in accordance with a type of a sub frame used. Specifically, the forward mode may be set as the control mode in a case in which the non-self-contained sub frame is used while the backward mode may be set in a case in which the self-contained sub frame is used. For example, usage of the non-self-contained sub frame or the self-contained sub frame may be set on the basis of RRC signaling, and the terminal device 2 may implicitly set the forward mode or the backward mode on the basis of the setting. Also, parameters (that is, $N_{TA}$ and $N_{TAoffset}$) for individually deciding timing advance values for the case in which the non-self-contained sub frame is used and the case in which the self-contained sub frame is used may be set.

For example, the control mode may be set in accordance with a duplex scheme. Specifically, the forward mode may be set as the control mode in the case of TDD while the backward mode may be set in the case of FDD.

For example, the control mode may be set in accordance with an application or a use case. Specifically, the forward mode may be set in a case of a first application or a first use case while the backward mode may be set in a case of a second application or a second use case. For example, the first application or the first use case is an application or a use case of a low latency communication while the second application or the second use case is an application or a use case of high-speed and broad-band communication.

For example, the control mode may be set in accordance with a subcarrier interval. Specifically, the forward mode may be set as the control mode in a case in which the sub carrier interval is equal to or less than a threshold value or is a first sub carrier interval while the backward mode may be set in a case in which the sub carrier interval exceeds the threshold value or is a second sub carrier interval. Note that the threshold value may be 15 kHz that is a sub carrier interval in LTE, for example. Note that in a case in which the sub carrier interval is a part of a set parameter set, the control mode may be set in accordance with the parameter set.

For example, the control mode may be set in accordance with a transmission time interval (TTI) length. Specifically, the forward mode may be set as the control mode in a case in which the TTI length is equal to or less than a threshold value or is a first TTI length while the backward mode may be set in a case in which the TTI length exceeds the threshold value or is a second TTI length. Note that the threshold value may be 1 milliseconds, for example. Note that the TTI length is a part of the set parameter set, the control mode may be set in accordance with the parameter set.

Note that the aforementioned setting references can be appropriately combined. For example, the control mode may be set in accordance with a combination of the RRC state and the access scheme. This is because the terminal device 2 can perform transmission without the timing advance that is performed for obtaining orthogonality in the RRC connected state in a case in which the non-orthogonal access scheme is used.

Also, although the specific examples of the cases in which the forward mode is set and the cases in which the backward mode is set have been described above, the forward mode and the backward mode may be set in an opposite manner in the respective specific examples.

Processing that Accompanies Switching of Control Mode

The terminal device 2 (for example, the communication control unit 2013) can perform processing that accompanies switching of the control mode.

In a case in which the control mode is switched from the backward mode to the forward mode, for example, parts of two continuous uplink sub frames overlap one another at the switching timing. Thus, in a case in which the control mode is switched from the backward mode to the forward mode, the terminal device 2 does not use a part or all of at least any one of two continuous uplink sub frames that have overlapping parts. For example, the terminal device 2 may not use, for transmission, all the symbols in any of the uplink sub frames at earlier or later transmission timings in the two uplink sub frames that have the overlapping parts. In that case, transmission of all channels and/or signals included in the subframe that is not used for the transmission is dropped. Also, the terminal device 2 may not use, for transmission, a part of symbols in any of the uplink sub frames at the earlier or later transmission timings in the two uplink sub frames that have the overlapping parts, for example. The symbols that are not used for the transmission include symbols that also overlap in a partial region. Therefore, the terminal device 2 can transmit channels and/or signals included in the symbols that are not used for the transmission with resources excluding the symbols.

Exceptional Processing

The terminal device 2 (for example, the setting unit 2011) may exceptionally switch the control mode under a predetermined condition even in a case in which the control mode is set on the basis of setting information from the base station device 1. The terminal device 2 may switch the control mode in a case in which a predetermined condition is satisfied, under a predetermined condition, in a case of transmission of a predetermined channel, and/or in a case of transmission of a predetermined signal, for example. For example, the terminal device 2 may switch the control mode to the forward mode in any of the following cases even if the backward mode has been set on the basis of the setting information from the base station device 1.

For example, the terminal device 2 may switch the control mode in accordance with a stage of access processing. For example, the terminal device 2 switches the control mode to the forward mode when random access processing is performed.

For example, the terminal device 2 may switch the control mode in accordance with a type of a channel to be transmitted. For example, the terminal device 2 switches the control mode to the forward mode when a random access channel is transmitted.

For example, the terminal device 2 may switch the control mode to the forward mode in accordance with a size of data to be transmitted or received. Specifically, the terminal device 2 switches the control mode to the forward mode in a case in which the size of data to be transmitted or received is greater than a threshold value. Here, the size of data can mean a transport block size or a size of a code word.

For example, the terminal device 2 may switch the control mode to the forward mode in accordance with the number of resource blocks allocated and/or an order of a modulation scheme (modulation order). Specifically, the terminal device 2 switches the control mode to the forward mode in a case in which the number of resource blocks allocated is greater than a threshold value and/or in a case in which the order of the modulation scheme is greater than a threshold value. This has a meaning that is similar to the switching in accordance with the size of data.

For example, the terminal device 2 may switch the control mode to the forward mode in a case in which an explicit or implicit notification of setting the forward mode by DCI is provided from the base station device 1. That is, the terminal device 2 sets statically or quasi-statically sets the backward mode on the basis of a notification using RRC signaling and dynamically switch the control mode to the forward mode on the basis of a notification using DCI.

For example, the terminal device 2 may switch the control mode to the forward mode in accordance with a set value (that is $T_{TA}$) of the timing advance. Specifically, the terminal device 2 switches the control mode to the forward mode in a case in which the set value of the timing advance is equal to or greater than a first threshold value or equal to or less than a second threshold value. Note that the first threshold value and the second threshold value may be the same or different from each other. Since the uplink transmission timing becomes earlier or later as the value of timing advance increases, this directly affects how long the processing time required before HARQ-ACK is generated after PDSCH is received, for example, is. Therefore, the terminal device 2 can switch the control mode to the forward mode only in a case in which it is possible to generate HARQ-ACK even in a processing time that becomes shorter corresponding to $T_{TA}$ in a case in which the self-contained sub frame is employed, for example. Meanwhile, the terminal device 2 can secure a sufficient processing time by maintaining the backward mode in a case in which the processing time becomes excessively short.

For example, the terminal device 2 may switch the control mode to the forward mode in accordance with RNTI used in scrambling a control channel (for example, PDCCH) of the downlink including scheduling information. Specifically, the terminal device 2 switches the control mode to the forward mode in a case in which the control channel of the downlink including the scheduling information is scrambled using predetermined RNTI. Here, the predetermined RNTI is RNTI that is not unique to the terminal device 2. For example, the predetermined RNTI may be RNTI that is used to transmit notification information.

For example, the terminal device 2 may switch the control mode to the forward mode in accordance with a searching space in which the control channel (for example, PDCCH) of the downlink including scheduling information is mapped. Specifically, the terminal device 2 switches the control mode to the forward mode in a case in which the control channel of the downlink including the scheduling information is mapped in a predetermined searching space. Here, the predetermined searching space may be a common searching space, for example. The switching in accordance with the searching space is similar to switching in accordance with RNTI in using, as a reference, whether or not the control channel is directed to the terminal device 2 itself.

For example, the terminal device 2 may switch the control mode to the first mode in accordance with whether or not to perform multiple sub frame scheduling (multi TTI scheduling) for performing scheduling for a plurality of sub frames (TTI). Specifically, the terminal device 2 uses a second mode in a case in which single sub frame scheduling (single TTI scheduling) for performing scheduling for one sub frame is performed and uses a first mode in a case in which multiple sub frame scheduling is performed.

Note that the aforementioned references of the exception processing can be appropriately combined. In addition, the forward mode and the backward mode may be the opposite in relation to the aforementioned references of the exception processing. That is, the forward mode may be set on the basis of setting information, and the control mode may be exceptionally switched to the backward mode on the basis of the aforementioned references.

3.4. Supplementary Note

Note that control of the transmission timing in the uplink has been described above, the present technology is not limited thereto. For example, the present technology can also be applied to control of a transmission timing in a side link. Here, the transmission timing in the side link is adjusted with reference to a timing reference frame. That is, the terminal device 2 performs transmission of the i-th wireless frame in the side link earlier or later than the corresponding i-th timing reference wireless frame as a reference by a predetermined timing advance time.

4. APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

4.1. Application Examples for Base Station

First Application Example

Figure 28:
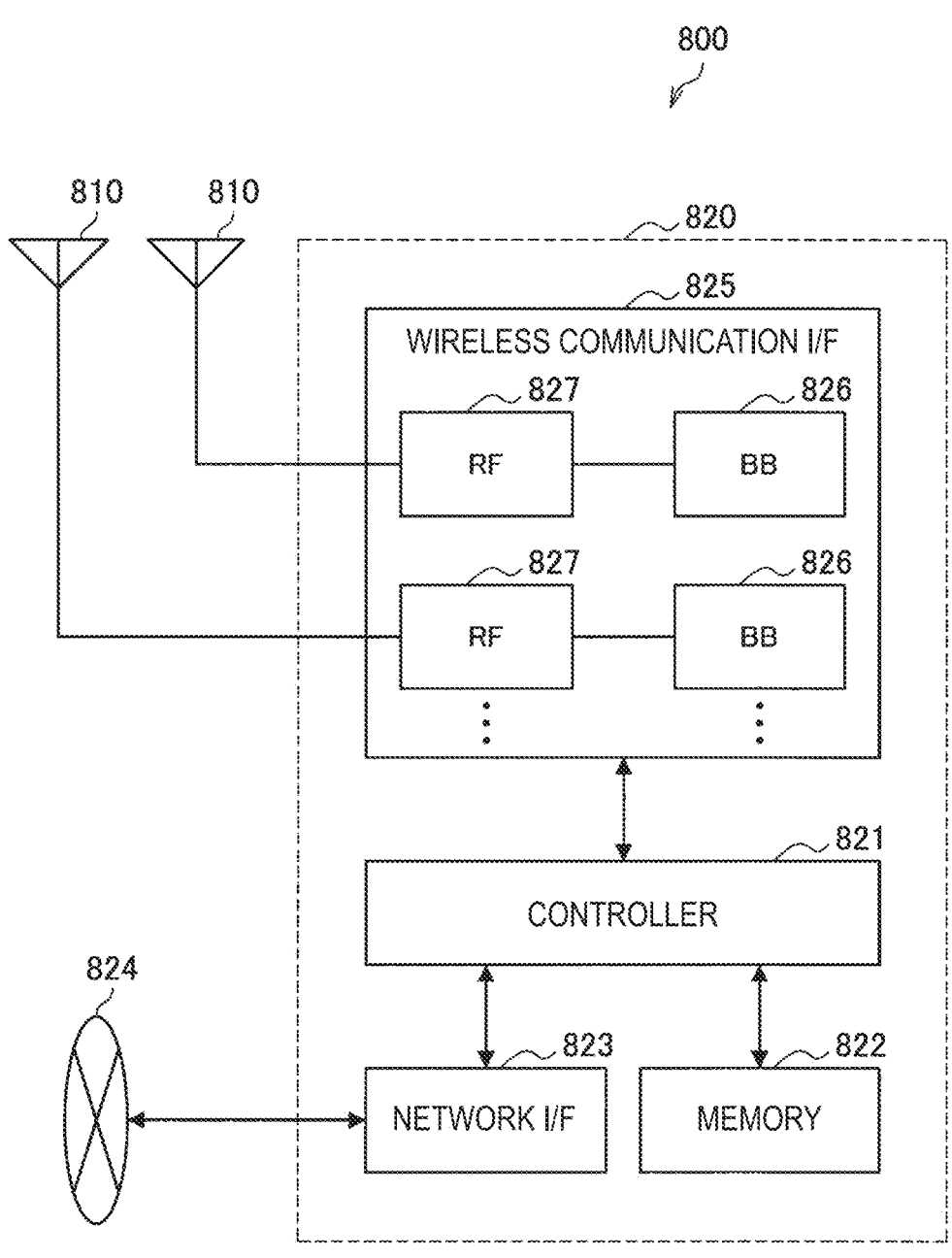
FIG. 28 is a block diagram illustrating a first example of a schematic configuration of an eNB.

FIG. 28 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 28, and the plurality of antennas 810 may, for example, correspond to a plurality of frequency bands used by the eNB 800. It should be noted that while FIG. 28 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 28, and the plurality of BB processors 826 may, for example, correspond to a plurality of frequency bands used by the eNB 800. Further, the wireless communication interface 825 may also include a plurality of the RF circuits 827, as illustrated in FIG. 28, and the plurality of RF circuits 827 may, for example, correspond to a plurality of antenna elements. Note that FIG. 28 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 28, one or more constituent elements (the setting unit 1011 and/or the communication control unit 1013) described with reference to FIG. 8 included in the higher layer processing unit 101 and/or the control unit 103 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station apparatus 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 28, the receiving unit 105 and the transmitting unit 107 described with reference to FIG. 8 may be implemented in the wireless communication interface 825 (for example, the RF circuit 827). Further, the transceiving antenna 109 may be implemented in the antenna 810.

Second Application Example

Figure 29:
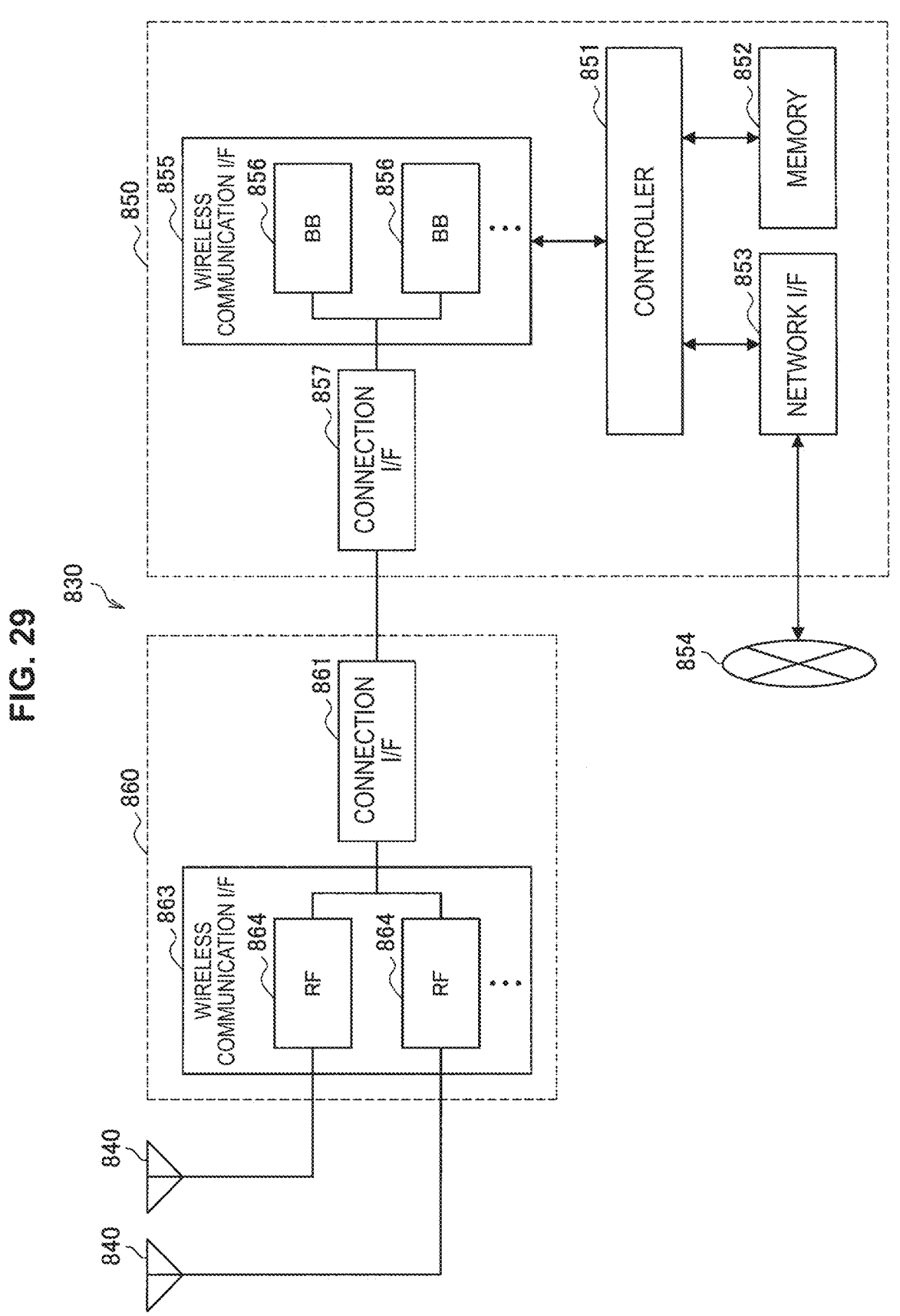
FIG. 29 is a block diagram illustrating a second example of the schematic configuration of the eNB.

FIG. 29 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 29, and the plurality of antennas 840 may, for example, correspond to a plurality of frequency bands used by the eNB 830. Note that FIG. 29 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 25.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 28 except that the BB processor 856 is connected to an RF circuit 864 of the RRH 860 via the connection interface 857. The wireless communication interface 855 may include a plurality of the BB processors 856, as illustrated in FIG. 29, and the plurality of BB processors 856 may, for example, correspond to a plurality of frequency bands used by the eNB 830. Note that FIG. 29 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 29, and the plurality of RF circuits 864 may, for example, correspond to a plurality of antenna elements. Note that FIG. 29 illustrates an example in which the wireless communication interface 863 includes the plurality of RF circuits 864, but the wireless communication interface 863 may include the single RF circuit 864.

In the eNB 830 illustrated in FIG. 29, one or more constituent elements (the setting unit 1011 and/or the communication control unit 1013) described with reference to FIG. 8 included in the higher layer processing unit 101 and/or the control unit 103 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 29, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840.

4.2. Application Examples for Terminal Device

First Application Example

Figure 30:
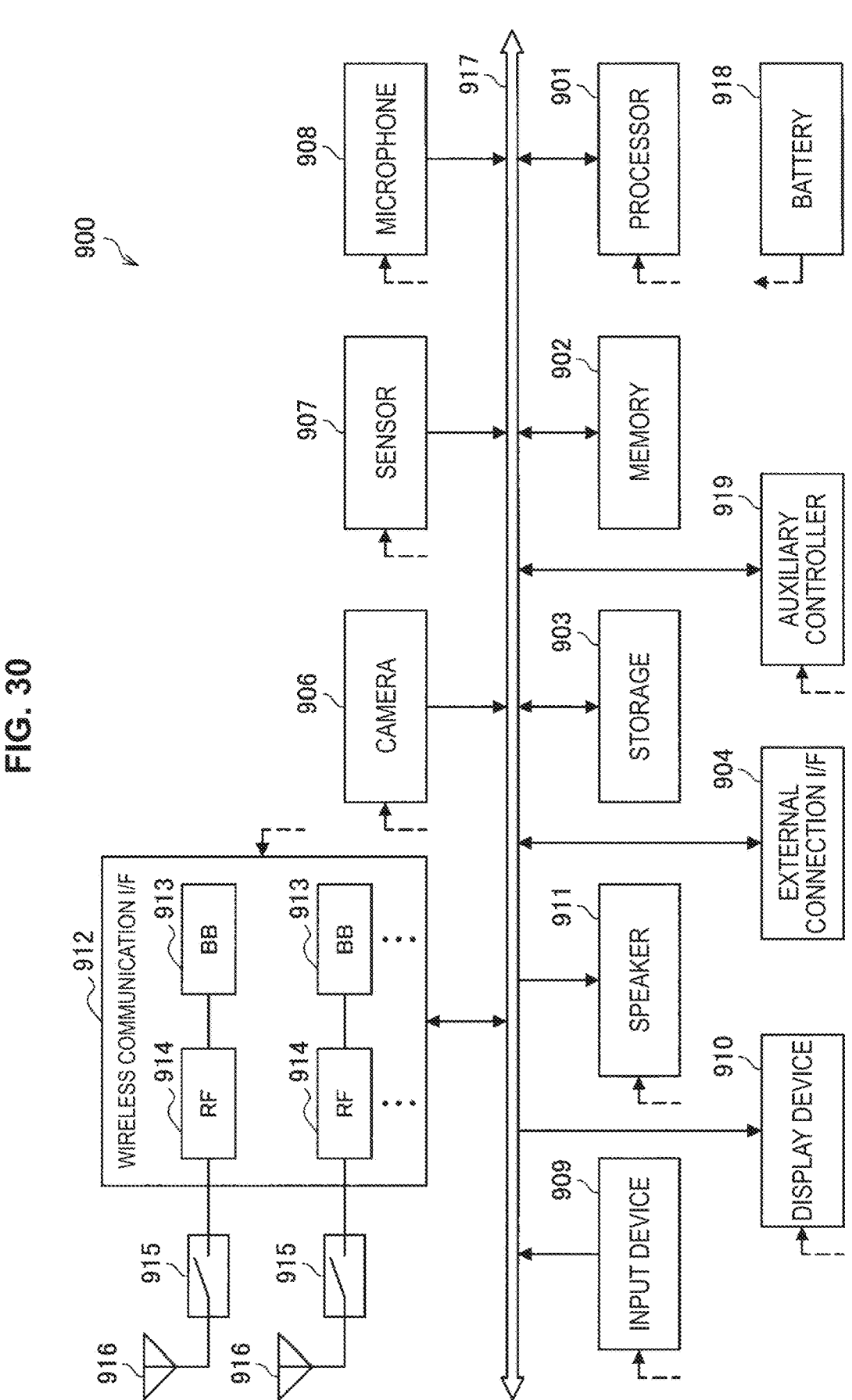
FIG. 30 is a block diagram illustrating an example of a schematic configuration of a smartphone.

FIG. 30 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 30. Note that FIG. 30 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 30. Note that FIG. 30 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 30 via a feeder line that is partially illustrated in the figure as a dashed line. The auxiliary controller 919, for example, operates a minimally necessary function of the smartphone 900 in a sleep mode.

In the smartphone 900 illustrated in FIG. 27, one or more constituent elements (the setting unit 2011 and/or the communication control unit 2013) included in the higher layer processing unit 201 and/or the control unit 203 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 30, for example, the receiving unit 205 and the transmitting unit 207 described with reference to FIG. 9 may be implemented in the wireless communication interface 912 (for example, the RF circuit 914). Further, the transceiving antenna 209 may be implemented in the antenna 916.

Second Application Example

Figure 31:
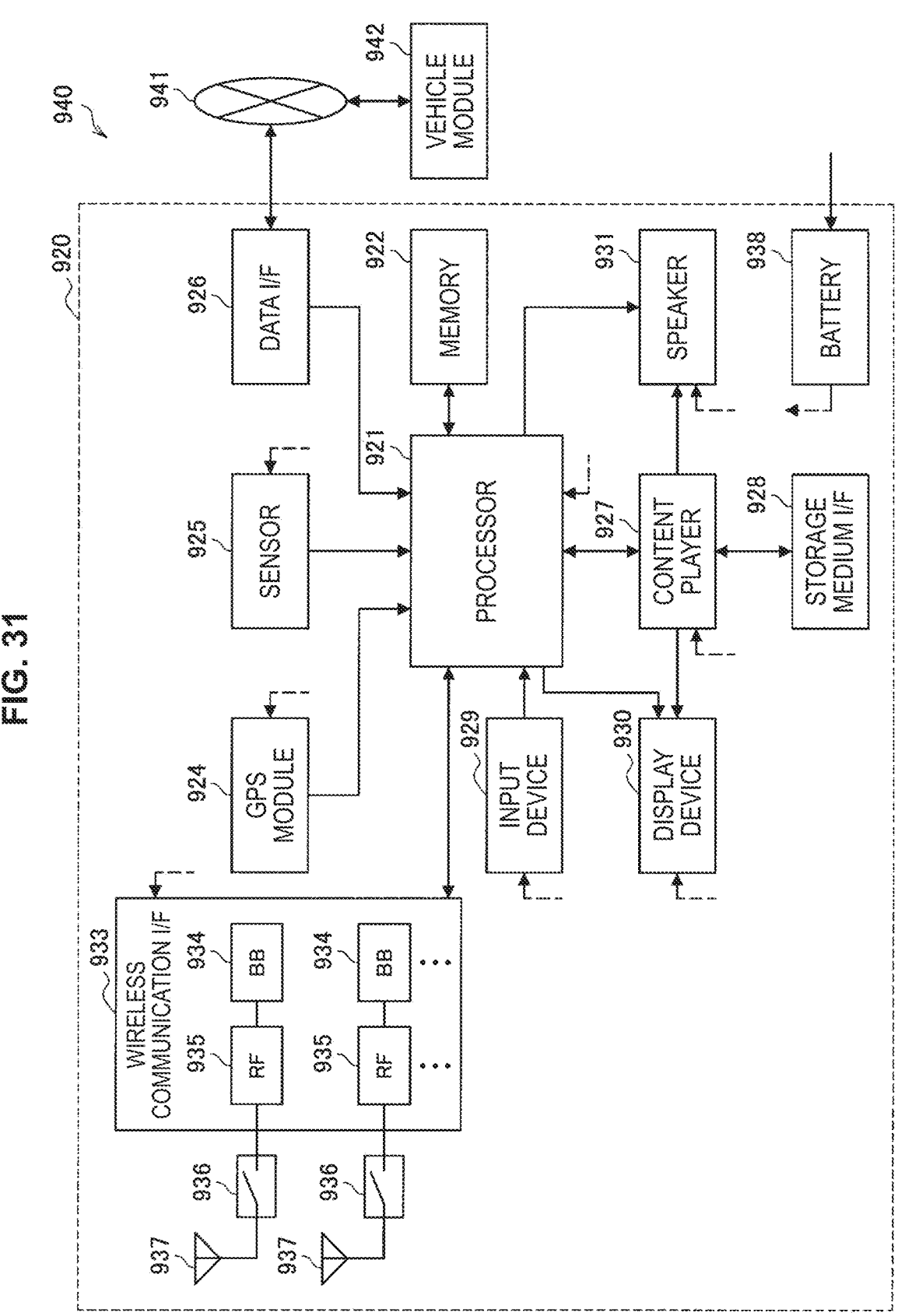
FIG. 31 is a block diagram illustrating an example of a schematic configuration of a car navigation apparatus.

FIG. 31 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 31. Note that FIG. 31 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 31. Note that FIG. 31 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 31 via a feeder line that is partially illustrated in the figure as a dashed line. Further, the battery 938 accumulates the electric power supplied from the vehicle.

In the car navigation apparatus 920 illustrated in FIG. 31, one or more constituent elements (the setting unit 2011 and the communication control unit 2013) included in the higher layer processing unit 201 and the control unit 203 described with reference to FIG. 9 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation apparatus 920. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the car navigation apparatus 920, and the wireless communication interface 933 (for example, the BB processor 934) and/or the processor 921 may execute the program. In this way, the car navigation apparatus 920 or the module may be provided as a device including the one or more constituent elements and a program causing the processor to function as the one or more constituent elements may be provided. In addition, a readable recording medium on which the program is recorded may be provided.

Further, in the car navigation apparatus 920 illustrated in FIG. 31, for example, the receiving unit 205 and the transmitting unit 207 described with reference to FIG. 9 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

5. CONCLUSION

The embodiment of the present disclosure has been described in detail with reference to FIGS. 1 to 31. As described above, the terminal device 2 controls communication with the base station device 1, which is the communication counterpart, through FDD. In addition, the terminal device 2 transmits the second sub frame that is transmitted from the terminal device 2 to the base station device 1 and corresponds to the first sub frame after the first sub frame that is transmitted from the base station device 1 to the terminal device 2 and in the communication through FDD. In this manner, the terminal device 2 can transmit the uplink sub frame after the reception start timing of the downlink sub frame unlike timing advance in LTE. In this manner, it becomes possible to achieve flexible design in relation to communication timings. Also, enabling such flexible design makes it possible to significantly improve transmission efficiency of the entire system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the processes described with reference to the flowcharts and the sequence diagrams in this specification are not necessarily executed in the order illustrated in the drawings. Several process steps may be executed in parallel. Further, an additional process step may be employed, or some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus including:

a communication control unit that controls communication with another communication apparatus, which is a communication counterpart, through frequency division duplexing (FDD), in which the communication control unit transmits a second sub frame that is transmitted from the communication apparatus to the other communication apparatus and corresponds to a first sub frame after the first sub frame that is transmitted from the other communication apparatus to the communication apparatus.

(2)

The communication apparatus according to (1), in which the first sub frame and the second sub frame at least partially overlap in a time region, and a last symbol of the first sub frame is arranged before a first symbol of a control channel of the second sub frame, or a last symbol of a control channel of the first sub frame is arranged before a first symbol of the second sub frame.

(3)

The communication apparatus according to (2), in which the communication control unit controls an interval between a reception start timing of the first sub frame and a transmission start timing of the second sub frame on the basis of the number of symbols of the control channel of the first sub frame or the second sub frame and a switching interval between reception of a channel in the first sub frame and transmission of a channel in the second sub frame.

(4)

The communication apparatus according to (3), in which the communication control unit communicates with the other communication apparatus using a non-orthogonal access scheme.

(5)

The communication apparatus according to any one of (1) to (4), further including:

a setting unit that sets a control mode of the communication control unit, in which the communication control unit transmits the second sub frame after the first sub frame in a case in which a first mode is set.

(6)

The communication apparatus according to (5), in which the communication control unit transmits the second sub frame before the first sub frame in a case in which a second mode is set.

(7)

The communication apparatus according to (6), in which the first sub frame and the first sub frame at least partially overlap in a time region, and in the second mode, a last symbol of a data channel of the first sub frame is arranged before a first symbol of a control channel of the second sub frame, or a last symbol of a control channel of the first sub frame is arranged before a first symbol of a data channel of the second sub frame.

(8)

The communication apparatus according to (6) or (7), in which the communication control unit does not use, for uplink transmission, a part or all of at least one of two continuous uplink sub frames that have an overlapping portion in a case in which the control mode is switched from the first mode to the second mode.

(9)

The communication apparatus according to any one of (6) to (8), in which the second mode is set as the control mode by default, and the first mode is set in a case in which a predetermined condition is satisfied.

US 12,695,581 B2

53

(10)

The communication apparatus according to any one of (5) to (9), in which the control mode is set in accordance with a radio resource control (RRC) state.

(11)

The communication apparatus according to any one of (5) to (10), in which the control mode is set in accordance with a duplex scheme.

(12)

The communication apparatus according to any one of (5) to (11), in which the control mode is set in accordance with a sub carrier interval.

(13)

The communication apparatus according to any one of (5) to (12), in which the control mode is set in accordance with a transmission time interval (TTI) length.

(14)

The communication apparatus according to any one of (5) to (13), in which the communication control unit controls a time required before setting of the control mode becomes valid.

(15)

A communication apparatus including:

a communication control unit that controls communication with another communication apparatus, which is a communication counterpart, through FDD, in which the communication control unit processes, in an associated manner, a first sub frame that is transmitted from the communication apparatus to the other communication apparatus and a second sub frame that is transmitted from the other communication apparatus to the communication apparatus after the first sub frame and corresponds to the first sub frame.

(16)

The communication apparatus according to (15), in which the other communication apparatus sets a first mode in which the second sub frame is transmitted after the first sub frame or a second mode in which the second sub frame is transmitted before the first sub frame, and the communication control unit processes, in an associated manner, the first sub frame and the second sub frame in a case in which the second mode is set.

(17)

A communication method that is executed by a processor of a communication apparatus, the communication method including:

controlling communication with another communication apparatus, which is a communication counterpart, through FDD, in which the controlling the communication includes transmitting a second sub frame that is transmitted from the communication apparatus to the other communication apparatus and corresponds to a first sub frame after the first sub frame that is transmitted from the other communication apparatus to the communication apparatus.

(18)

A communication method that is executed by a processor of a communication apparatus, the communication method including:

controlling communication with another communication apparatus, which is a communication counterpart, through FDD, in which the controlling the communication includes processing, in an associated manner, a first sub frame that is transmitted from the communication apparatus to the other communication apparatus and a second sub frame that is transmitted from the other communication apparatus to the communication apparatus after the first sub frame and corresponds to the first sub frame.

(19)

A recording medium having a program recorded thereon, the program causing a computer to function as a communication apparatus including a communication control unit that controls communication with another communication apparatus, which is a communication counterpart, through FDD, in which the communication control unit transmits a second sub frame that is transmitted from the communication apparatus to the other communication apparatus and corresponds to a first sub frame after the first sub frame that is transmitted from the other communication apparatus to the communication apparatus.

(20)

A recording medium having a program recorded thereon, the program causing a computer to function as a communication apparatus including a communication control unit that controls communication with another communication apparatus, which is a communication counterpart, through FDD, in which the communication control unit processes, in an associated manner, a first sub frame that is transmitted from the communication apparatus to the other communication apparatus and a second sub frame that is transmitted from the other communication apparatus to the communication apparatus after the first sub frame and corresponds to the first sub frame.

REFERENCE SIGNS LIST 1 base station device
101 higher layer processing unit
1011 setting unit
1013 communication control unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
2011 setting unit
2013 communication control unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit 2077 wireless transmitting unit
2079 uplink reference signal generating unit
209 transceiving antenna
The invention claimed is:

1. A first radio communication device comprising:
a radio transceiver; and
circuitry coupled with the radio transceiver and configured to:
receive, from a second radio communication device, setting information related to uplink transmission from the first radio communication device, the setting information including information indicating which of a first mode and a second mode is to be set to the first radio communication device; and
switch, based on the setting information, a transmission timing mode between the first mode and the second mode, wherein a time required before setting of the transmission timing mode becomes valid after the transmission timing mode is set is set for the first radio communication device separately from the setting information,
wherein the first mode is a first transmission timing mode in which the first communication apparatus performs uplink transmission on an i-th wireless frame later than the corresponding i-th wireless frame for downlink transmission, and
wherein the second mode is a second transmission timing mode in which the first communication apparatus performs uplink transmission on an i-th wireless frame earlier than the corresponding i-th wireless frame for downlink transmission.

2. The first radio communication device according to the claim 1, wherein the circuitry is further configured to, for both the first mode and the second mode:
receive a Timing Advance command from the second radio communication device, and
control, based on a timing advance time ($N_{TA}$) and an offset ($N_{TAoffset}$), uplink transmission timing of the uplink transmission from the first radio communication device, wherein the $N_{TA}$ is set based on the received Timing Advance command.

3. The first radio communication device according to the claim 2, wherein $N_{TAoffset}$ is defined in advance based on a communication scheme and communication parameters.

4. The first radio communication device according to the claim 2, wherein $N_{TAoffset}$ is a predetermined value corresponding to a time for switching between uplink transmission and downlink transmission.

5. The first radio communication device according to the claim 2, wherein, in the first mode, $N_{TA}$ is set to zero.

6. The first radio communication device according to the claim 2, wherein $N_{TA}$ is set based on a number of symbols of a control channel in a downlink subframe.

7. The first radio communication device according to the claim 2, wherein $N_{TA}$ is set based on a number of symbols of a control channel in an uplink subframe.

8. The first radio communication device according to the claim 2, wherein $N_{TAoffset}$ is set based on a symbol length of a PUCCH subframe.

9. A second radio communication device comprising:
a radio transceiver; and
circuitry coupled with the radio transceiver and configured to:
send, to a first radio communication device, setting information related to uplink transmission from the first radio communication device, the setting information including information indicating which of a first mode and a second mode is to be set to the first radio communication device; and
set, for the first radio communication device separately from the setting information, a time required before setting of a transmission timing mode of the first radio communication device becomes valid after the transmission timing mode is set,
wherein the first mode is a first transmission timing mode in which the first communication apparatus performs uplink transmission on an i-th wireless frame later than the corresponding i-th wireless frame for downlink, and
wherein the second mode is a second transmission timing mode in which the first communication apparatus performs uplink transmission on an i-th wireless frame earlier than the corresponding i-th wireless frame for downlink, and
wherein the transmission timing mode of the first radio communication is set based on the setting information to either the first mode or the second mode.

10. The second radio communication device according to the claim 9, wherein the circuitry is further configured to, for both the first mode and the second mode:
send a Timing Advance command to the first radio communication device,
wherein uplink transmission timing of the uplink transmission from the first radio communication device is controlled based on a timing advance time ($N_{TA}$) and an offset ($N_{TAoffset}$),
wherein the $N_{TA}$ is set based on the sent Timing Advance command.

11. The second radio communication device according to the claim 10, wherein $N_{TAoffset}$ is defined in advance based on a communication scheme and communication parameters.

12. The second radio communication device according to the claim 10, wherein $N_{TAoffset}$ is a predetermined value corresponding to a time for switching between uplink transmission and downlink transmission.

13. The second radio communication device according to the claim 10, wherein, in the first mode, $N_{TA}$ is set to zero.

14. The second radio communication device according to the claim 10, wherein $N_{TA}$ is set based on a number of symbols of a control channel in a downlink subframe.

15. The second radio communication device according to the claim 10, wherein $N_{TA}$ is set based on a number of symbols of a control channel in an uplink subframe.

16. The second radio communication device according to the claim 10, wherein $N_{TAoffset}$ is set based on a symbol length of a PUCCH subframe.

17. The first radio communication device according to claim 1, wherein the first mode is set in a case that the first radio communication device is in a radio resource control (RRC) connected state.

18. The first radio communication device according to claim 1, wherein the circuitry switches between the first mode and the second mode based on whether a non-orthogonal access scheme is used for the uplink transmission.

19. The first radio communication device according to claim 1, wherein the circuitry switches the transmission timing mode to the second mode in a case that the first radio communication devices performs random access processing.

20. The second radio communication device according to claim 9, wherein the circuitry is configured to set the transmission timing mode to the first mode in a case that a subcarrier interval for the uplink transmission exceeds a predetermined threshold.

\* \* \* \* \*